US008583435B2

(12) United States Patent
Ishikawa et al.

(10) Patent No.: US 8,583,435 B2
(45) Date of Patent: Nov. 12, 2013

(54) REQUEST CONTENT IDENTIFICATION SYSTEM, REQUEST CONTENT IDENTIFICATION METHOD USING NATURAL LANGUAGE, AND PROGRAM

(75) Inventors: Kai Ishikawa, Tokyo (JP); Susumu Akamine, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 927 days.

(21) Appl. No.: 12/224,885

(22) PCT Filed: Mar. 9, 2007

(86) PCT No.: PCT/JP2007/054632
§ 371 (c)(1),
(2), (4) Date: Sep. 9, 2008

(87) PCT Pub. No.: WO2007/105615
PCT Pub. Date: Sep. 20, 2007

(65) Prior Publication Data
US 2009/0099840 A1      Apr. 16, 2009

(30) Foreign Application Priority Data

Mar. 10, 2006   (JP) ................................. 2006-066097

(51) Int. Cl.
*G10L 15/18* (2013.01)
*G06F 17/27* (2006.01)
(52) U.S. Cl.
USPC ............................................. 704/257; 704/9
(58) Field of Classification Search
None
See application file for complete search history.

(56) References Cited

U.S. PATENT DOCUMENTS

| 5,895,446 A | 4/1999 | Takeda et al. |
| 5,991,712 A * | 11/1999 | Martin .............................. 704/9 |
| 6,714,905 B1 * | 3/2004 | Chang et al. ...................... 704/9 |
| 7,072,826 B1 * | 7/2006 | Wakita .............................. 704/2 |
| 7,302,381 B2 * | 11/2007 | Pokhariyal et al. ............... 704/1 |
| 7,302,383 B2 * | 11/2007 | Valles ............................... 704/9 |
| 2003/0004728 A1 * | 1/2003 | Keiller .......................... 704/275 |

FOREIGN PATENT DOCUMENTS

| JP | 10-011447 | 1/1998 |
| JP | 3358100 | 10/2002 |
| JP | 2003-223185 | 8/2003 |

* cited by examiner

*Primary Examiner* — Brian Albertalli
(74) *Attorney, Agent, or Firm* — Foley & Lardner LLP

(57) ABSTRACT

A request content identification system performs an audio recognition process according to audio data inputted from an input device (100*b*) and performs a request analysis process by using a common rule stored in common rule storage means (401) and a request unique rule stored in request unique rule storage means (402). Moreover, the request content identification system performs a similar document search process between the audio recognition result and an information request sentence or a reply stored in replay request data storage means (404). Request candidate score calculation means (304*c*) calculates an integrated score from an audio recognition score, a request analysis score, and a similar document search score obtained by the respective processes. Request identification result generation means (302*b*) identifies the request content having the highest integrated score and sends it to an output device (200).

8 Claims, 20 Drawing Sheets

| DENOTATION SYMBOL | INFORMATION REQUEST SENTENCE (TEXT OR AUDIO RECOGNITION RESULT) |
|---|---|
| $r_A$ | Sho-tome-ru jyusinn ji no gamenn ha settei dekimasu ka? |
| $r_B$ | Sho-tome-ru jyusinn kinou gamenn ha settei dekimasu ka? |
| $r_C$ | Sho-tome-ru jyusinn chihou bamenn ha kettei dekimasu ka? |

FIG. 14

COMMON RULE (a)

ROOT → S
S → S y
S → PP VP
PP → NP p
NP → ADJP NP
ADJP → VP n p
VP → vw v y
NP → n NP
NP → n

COMMON RULE (b)

n → Sho-tome-ru
n → jyusinn
n → ji
p → no
n → gamenn
p → ha
v → settei
vw → dekimasu
y → ka REQUEST CONTENT-UNIQUE RULE (a)

ROOT → S19
S19 → S19 y
S19 → PP19 VP19
S19 → PP19 VP
S19 → PP VP19
PP19 → NP19 p
NP19 → ADJP19 NP19
NP19 → ADJP NP19
NP19 → ADJP19 NP
ADJP19 → VP19 n p
NP19 → n NP19

REQUEST CONTENT-UNIQUE RULE (b)

NP19 → Sho-tome-ru jyusinn gamenn
NP19 → Sho-tome-ru jyusinn p gamenn
NP19 → Sho-tome-ru jyusinn n p gamenn
NP19 → Sho-tome-ru jyusinn ADJP gamenn
NP19 → Sho-tome-ru jyusinn NP gamenn
NP19 → Sho-tome-ru p jyusinn gamenn
NP19 → Sho-tome-ru p jyusinn suru gamenn
NP19 → Sho-tome-ru jyusinn n p gamenn
NP19 → Sho-tome-ru jyusinn ADJP gamenn
NP19 → Sho-tome-ru jyusinn NP gamenn

FIG. 15

FIRST ANALYSIS CANDIDATE S₁ (r_A) FOR INFORMATION REQUEST SENTENCE (r_A)

```
ROOT /[
  S19 /[
    PP19 /[
      NP19/[Sho-tome-ru jyusinn n /[ji] p /[no] gamenn]
      p /[ha]
    ]
    VP /[v /[settei] vw /[dekimasu] y /[ka]]
  ]
]
ANALYSIS SCORE=-25
```

SECOND ANALYSIS CANDIDATE S₂ (r_A) FOR INFORMATION REQUEST SENTENCE (r_A)

```
ROOT /[
  S15 /[
    VP15 /[
      VP15 /[
        Sho-tome-ru
        NP /[
          ADJP /[
            NP /[jyusinn]
            n /[ji]
            p /[no]
          ]
          NP[n /[gamenn]
        ]
        p /[ha]
        settei
      ]
      vw /[dekimasu] y /[ka]
    ]
  ]
]
ANALYSIS SCORE=-35
```

THIRD ANALYSIS CANDIDATE S₃ (r_A) FOR INFORMATION REQUEST SENTENCE (r_A)

```
ROOT /[
  S /[
    PP /[
      NP /[
        ADJP /[
          NP /[
            n /[Sho-tome-ru]
            NP /[n /[jyusinn]]
          ]
          n /[ji] p /[no]
        ]
        NP /[n /[gamenn]
      ]
      p /[ha]
    ]
    VP /[v /[settei] vw /[dekimasu] y /[ka]]
  ]
]
ANALYSIS SCORE=-40
```

FIG. 16

FIRST ANALYSIS CANDIDATE S₁ (r_B) FOR INFORMATION REQUEST SENTENCE (r_B)

```
ROOT /[
  S15 /[
    VP15 /[
      VP15 /[
        Sho-tome-ru
        NP /[
          n /[jyusinn]
          NP /[
            n /[kinou]
            n /[gamenn]
          ]
        ]
        p /[ha]
        settei
      ]
      vw /[dekimasu] y /[ka]
    ]
  ]
]
ANALYSIS SCORE=-35
```

SECOND ANALYSIS CANDIDATE S₂ (r_B) FOR INFORMATION REQUEST SENTENCE (r_B)

```
ROOT /[
  S /[
    PP /[
      NP /[
        n /[Sho-tome-ru]
        NP /[
          n /[jyusinn]
          NP /[
            n /[kinou]
            n /[gamenn]
          ]
        ]
      ]
      p /[ha]
    ]
    VP /[v /[settei] vw /[dekimasu] y /[ka]]
  ]
]
ANALYSIS SCORE=-40
```

THIRD ANALYSIS CANDIDATE S₃ (r_B) FOR INFORMATION REQUEST SENTENCE (r_B)

```
ROOT /[
  S19 /[
    PP19 /[
      NP19 /[
        Sho-tome-ru
        jyusinn
        NP /[n /[kinou]]
        gamenn
      ]
      p /[ha]
    ]
    VP /[v /[settei] vw /[dekimasu] y /[ka]]
  ]
]
ANALYSIS SCORE=-45
```

FIG. 17

| AUDIO RECOGNITION RESULT CANDIDATE | | REQUEST ANALYSIS RESULT CANDIDATE | | | ... |
|---|---|---|---|---|---|
| | | FIRST CANDIDATE | SECOND CANDIDATE | THIRD CANDIDATE | |
| FIRST CANDIDATE | RECOGNITION RESULT=$r_B$ RECOGNITION SCORE=-20 | ANALYSIS RESULT=$S_1(r_B)$ Q=$Q_{15}$ ANALYSIS SCORE=-35 | ANALYSIS RESULT=$S_2(r_B)$ Q=$Q_0$ ANALYSIS SCORE=-40 | ANALYSIS RESULT=$S_3(r_B)$ Q=$Q_{19}$ ANALYSIS SCORE=-45 | ... |
| SECOND CANDIDATE | RECOGNITION RESULT=$r_A$ RECOGNITION SCORE=-22 | ANALYSIS RESULT=$S_1(r_A)$ Q=$Q_{19}$ ANALYSIS SCORE=-25 | ANALYSIS RESULT=$S_2(r_A)$ Q=$Q_{15}$ ANALYSIS SCORE=-35 | ANALYSIS RESULT=$S_3(r_A)$ Q=$Q_0$ ANALYSIS SCORE=-40 | ... |
| : | : | : | : | : | : |

FIG. 18

| AUDIO RECOGNITION RESULT CANDIDATE | | REQUEST CONTENT NUMBER | | | | | |
|---|---|---|---|---|---|---|---|
| | | ... | $Q_{15}$ | ... | $Q_{19}$ | ... | $Q_0$ |
| FIRST CANDIDATE | $r_B$ | ... | -55 (-20, -35) | ... | -65 (-20, -45) | ... | -60 (-20, -40) |
| SECOND CANDIDATE | $r_A$ | ... | -57 (-22, -35) | ... | -47 (-22, -25) | ... | -62 (-22, -40) |
| : | : | : | : | : | : | : | : |

FIG. 19

| INFORMATION REQUEST SENTENCE | REQUEST CONTENT NUMBER | | | | ... |
|---|---|---|---|---|---|
| | ... | $Q_{15}$ | ... | $Q_{19}$ | ... |
| $r_A$ | ... | +3 | ... | +15 | ... |
| $r_B$ | ... | +3 | ... | +15 | ... |
| $r_C$ | ... | +2 | ... | +2 | ... |

FIG. 20

| INFORMATION REQUEST SENTENCE | REQUEST CONTENT NUMBER | | | | | |
|---|---|---|---|---|---|---|
| | ... | $Q_{15}$ | ... | $Q_{19}$ | ... | $Q_0$ |
| $r_B$ | ... | -32 (-35, +3) | ... | -30 (-45, +15) | ... | -40 (-40, 0) |

FIG. 21

FIRST ANALYSIS CANDIDATE $S_1(r_C)$ FOR INFORMATION REQUEST SENTENCE ($r_C$)

```
ROOT /[
  S /[
    PP /[
      NP /[
        n /[Sho-tome-ru]
        NP /[
          n /[tyusinn]
          NP /[
            n /[chihou]
            NP /[n /[bamenn]]
          ]
        ]
      ]
      p /[ha]
    ]
    VP /[v /[kettei] vw /[dekimasu]  y /[ka]]
  ]
]
ANALYSIS SCORE=-50
```

FIG. 22

| AUDIO RECOGNITION RESULT CANDIDATE | | REQUEST ANALYSIS RESULT CANDIDATE | | | |
|---|---|---|---|---|---|
| | | FIRST CANDIDATE | SECOND CANDIDATE | THIRD CANDIDATE | ... |
| FIRST CANDIDATE | RECOGNITION RESULT=$r_C$ RECOGNITION SCORE=-20 | ANALYSIS RESULT=$S_1(r_C)$ Q=$Q_0$ ANALYSIS SCORE=-50 | — | — | ... |
| SECOND CANDIDATE | RECOGNITION RESULT=$r_B$ RECOGNITION SCORE=-22 | ANALYSIS RESULT=$S_1(r_B)$ Q=$Q_{15}$ ANALYSIS SCORE=-35 | ANALYSIS RESULT=$S_2(r_B)$ Q=$Q_0$ ANALYSIS SCORE=-40 | ANALYSIS RESULT=$S_3(r_B)$ Q=$Q_{19}$ ANALYSIS SCORE=-45 | ... |
| : | : | : | : | : | : |

FIG. 23

| AUDIO RECOGNITION RESULT CANDIDATE | | REQUEST CONTENT NUMBER | | | | |
|---|---|---|---|---|---|---|
| | | ... | $Q_{15}$ | ... | $Q_{19}$ | ... | $Q_0$ |
| FIRST CANDIDATE | $r_C$ | ... | -118 (-20, -100, +2) | ... | -118 (-20, -100, +2) | ... | -70 (-20, -50, +0) |
| SECOND CANDIDATE | $r_B$ | ... | -54 (-22, -35, +3) | ... | -52 (-22, -45, +15) | ... | -62 (-22, -40, +0) |
| : | : | : | : | : | : | : |

FIG. 24

COMMON RULE(a)

ROOT → S
S → S y
S → PP VP
PP → NP p
NP → ADJP NP
ADJP → VP n p
VP → vw v y
NP → n NP
NP → n

COMMON RULE(b)

n → Sho-tome-ru
n → jyusinn
n → ji
p → no
n → gamenn
p → ha
v → settei
vw → dekimasu
y → ka

REQUEST CONTENT-UNIQUE RULE 19(a)

ROOT → S
S → S y
S → PP VP
S → PP VP
S → PP VP
PP → NP p
NP → ADJP NP
NP → ADJP NP
NP → ADJP NP
ADJP → VP n p
NP → n NP

REQUEST CONTENT-UNIQUE RULE 19(b)

NP → Sho-tome-ru jyusinn gamenn
NP → Sho-tome-ru jyusinn p gamenn
NP → Sho-tome-ru jyusinn n p gamennn
NP → Sho-tome-ru jyusinn ADJP gamenn
NP → Sho-tome-ru jyusinn NP gamenn
NP → Sho-tome-ru p jyusinn gamenn
NP → Sho-tome-ru p jyusinn suru gamenn
NP → Sho-tome-ru jyusinn n p gamenn
NP → Sho-tome-ru jyusinn ADJP gamenn
NP → Sho-tome-ru jyusinn NP gamenn

FIG. 25

FIRST ANALYSIS CANDIDATE $S^{(19)}_1 (r_A)$ OBTAINED BY EMPLOYING REQUEST
CONTENT-UNIQUE RULE 19 FOR INFORMATION REQUEST SENTENCE $r_A$

```
ROOT /[
  S /[
    PP /[
      NP /[Sho-tome-ru jyusinn n /[ji] p /[no] gamenn]
      p /[ha]
    ]
    VP /[v /[settei] vw /[dekimasu] y /[ka]]
  ]
]
ANALYSIS SCORE=-25
```

FIRST ANALYSIS CANDIDATE $S^{(15)}_1 (r_A)$ OBTAINED BY EMPLOYING REQUEST
CONTENT-UNIQUE RULE 15 FOR INFORMATION REQUEST SENTENCE $r_A$

```
ROOT /[
  S /[
    VP /[
      VP /[
        Sho-tome-ru
        NP /[
          ADJP /[
            NP /[jyusinn]
            n /[ji]
            p /[no]
          ]
          VP[n /[gamenn]]
        ]
        p /[ha]
        settei
      ]
      vw /[dekimasu] y /[ka]
    ]
  ]
]
ANALYSIS SCORE=-35
```

FIRST ANALYSIS CANDIDATE $S^{(0)}_1 (r_A)$ OBTAINED BY EMPLOYING NO REQUEST
CONTENT-UNIQUE RULE FOR INFORMATION REQUEST SENTENCE $r_A$

```
ROOT /[
  S /[
    PP /[
      NP /[
        ADJP /[
          NP /[
            n /[Sho-tome-ru]
            NP /[n /[jyusinn]]
          ]
          n /[ji] p /[no]
        ]
        NP /[n /gamenn]
      ]
      p /[ha]
    ]
    VP /[v /[settei] vw /[dekimasu] y /[ka]]
  ]
]
ANALYSIS SCORE=-40
```

FIG. 26

| DENOTATION SYMBOL | INFORMATION REQUEST SENTENCE (TEXT OR AUDIO RECOGNITION RESULT) |
|---|---|
| $r_D$ | Sho-tome-ru jyusinn ji no settei ha dekimasu ka? |

REQUEST CONTENT-UNIQUE RULE 20(a)

```
ROOT → S
S → S y
S → PP VP
S → PP VP
S → PP VP
PP → NP p
NP → ADJP NP
NP → ADJP NP
NP → ADJP NP
ADJP → VP n p
NP → n NP
```

REQUEST CONTENT-UNIQUE RULE 20(b)

```
NP → Sho-tome-ru jyusinn onngaku
NP → Sho-tome-ru jyusinn p onngaku
NP → Sho-tome-ru jyusinn n p onngaku
NP → Sho-tome-ru jyusinn ADJP onngaku
NP → Sho-tome-ru jyusinn NP onngaku
NP → Sho-tome-ru p jyusinn onngaku
NP → Sho-tome-ru p jyusinn suru onngaku
NP → Sho-tome-ru jyusinn n p onngaku
NP → Sho-tome-ru jyusinn ADJP onngaku
NP → Sho-tome-ru jyusinn NP onngaku
```

REQUEST CLUSTER-UNIQUE RULE 3

```
NP → Sho-tome-ru jyusinn n
NP → Sho-tome-ru jyusinn p n
NP → Sho-tome-ru jyusinn n p n
NP → Sho-tome-ru jyusinn ADJP n
NP → Sho-tome-ru jyusinn NP n
NP → Sho-tome-ru p jyusinn n
NP → Sho-tome-ru p jyusinn suru n
NP → Sho-tome-ru jyusinn n p n
NP → Sho-tome-ru jyusinn ADJP n
NP → Sho-tome-ru jyusinn NP n
```

FIG. 29

FIRST ANALYSIS CANDIDATE $S^{(19)}_1$ ($r_A$) OBTAINED BY EMPLOYING REQUEST CONTENT-UNIQUE RULE 19 FOR INFORMATION REQUEST SENTENCE $r_A$

```
ROOT /[
   S /[
      PP /[
         NP /Sho-tome-ru jyusinn n /[ji] p /[no] gamenn]
         p /[ha]
      ]
      VP /[v /[settei] vw /[dekimasu] y /[ka]]
   ]
]
ANALYSIS SCORE=-25
```

FIRST ANALYSIS CANDIDATE $S^{(20)}_1$ ($r_A$) OBTAINED BY EMPLOYING REQUEST CONTENT-UNIQUE RULE 20 FOR INFORMATION REQUEST SENTENCE $r_A$

```
ROOT /[
   S /[
      VP /[
         VP /[
            Sho-tome-ru
            NP /[
               ADJP /[
                  NP /[jyusinn]
                  n /[ji]
                  p /[no]
               ]
               VP[n /[gamenn]]
            ]
            p /[ha]
            settei
         ]
         vw /[dekimasu] y /[ka]
      ]
   ]
]
ANALYSIS SCORE=-35
```

FIRST ANALYSIS CANDIDATE $S^{(C3)}_1$ ($r_A$) OBTAINED BY EMPLOYING REQUEST CONTENT-UNIQUE RULES C3, 19 AND 20 FOR INFORMATION REQUEST SENTENCE $r_A$

```
ROOT /[
   S /[
      PP /[
         NP /[Sho-tome-ru jyusinn n /[ji] p /[no] gamenn]
         p /[ha]
      ]
      VP /[v /[settei] vw /[dekimasu] y /[ka]]
   ]
]
ANALYSIS SCORE=-25
```

FIG. 30

FIRST ANALYSIS CANDIDATE $S^{(19)}_1 (r_D)$ OBTAINED BY EMPLOYING REQUEST CONTENT-UNIQUE RULE 19 FOR INFORMATION REQUEST SENTENCE $r_D$

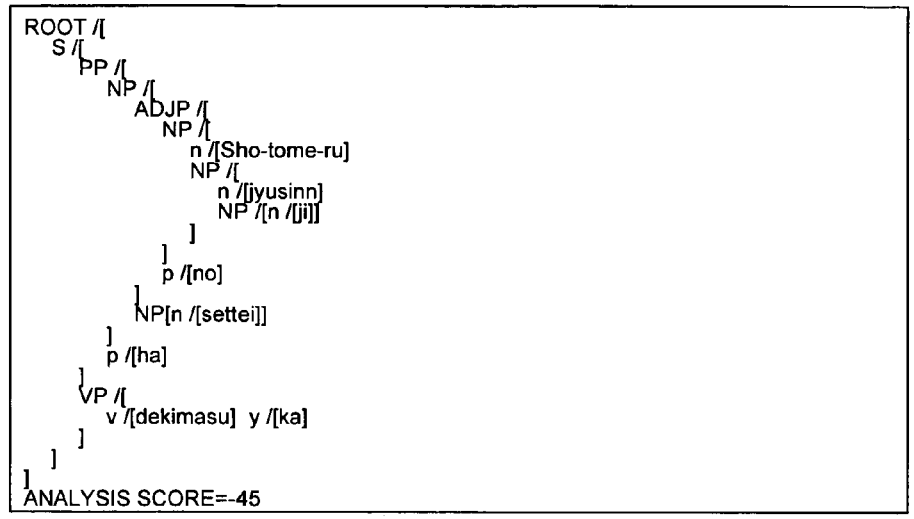

FIRST ANALYSIS CANDIDATE $S^{(20)}_1 (r_D)$ OBTAINED BY EMPLOYING REQUEST CONTENT-UNIQUE RULE 20 FOR INFORMATION REQUEST SENTENCE $r_D$

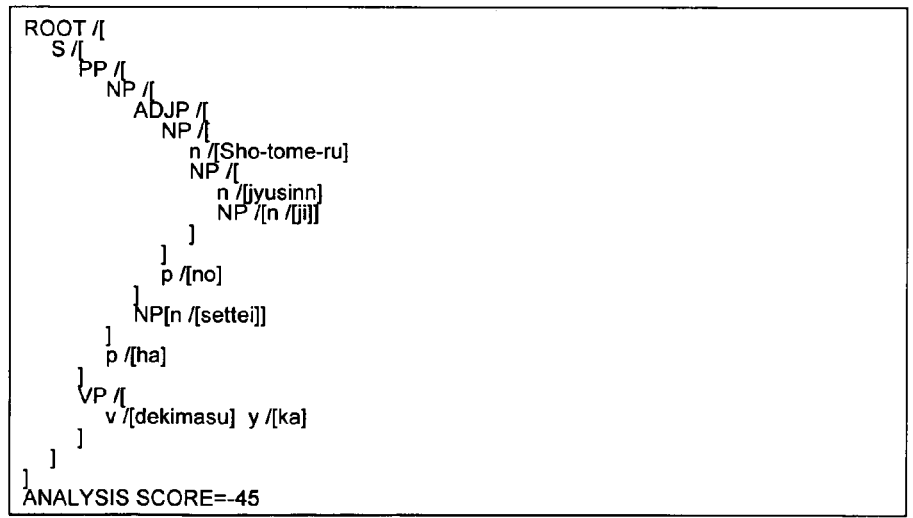

FIRST ANALYSIS CANDIDATE $S^{(C3)}_1 (r_D)$ OBTAINED BY EMPLOYING REQUEST CONTENT-UNIQUE RULES C3, 19 AND 20 FOR INFORMATION REQUEST SENTENCE $r_D$

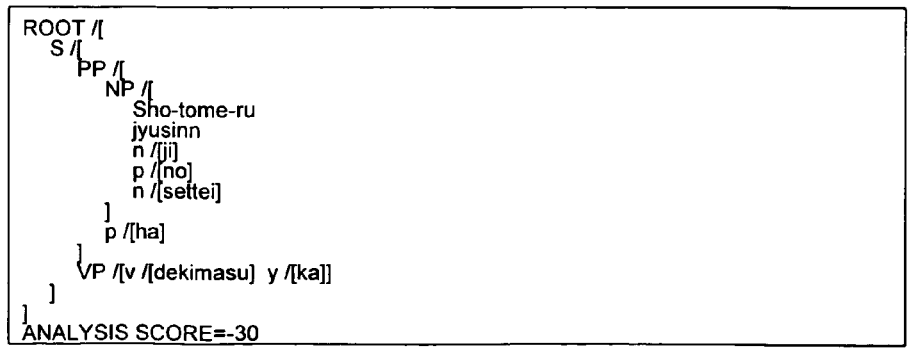

REQUEST CONTENT IDENTIFICATION SYSTEM, REQUEST CONTENT IDENTIFICATION METHOD USING NATURAL LANGUAGE, AND PROGRAM

CROSS-REFERENCE TO RELATED PATENT APPLICATIONS

This application is the National Phase of PCT/JP2007/054632, filed Mar. 9, 2007, which claims priority to Japanese Patent Application No. 2006-066097, filed Mar. 10, 2006. The contents of the foregoing applications are incorporated by reference in their entirety.

APPLICABLE FIELD IN THE INDUSTRY

The present invention relates to a request content identification system, a request content identification method using a natural language, and a program, and more particularly to a request content identification system capable of analyzing a request sentence (input request sentence) inputted in a natural language format and identifying/outputting a request content of the above input request sentence, a request content identification method using a natural language, and a program.

BACKGROUND ART

Conventionally, the technique of, responding to an information request being inputted by a user, sequentially juxtaposing a content-related document aggregation in the descending order of a relation degree and outputting it, has been known. In the recent years, the inquiry-response technology of not only proposing documents associated with an information request in a simple manner but also identifying the content of the information request from an inputted inquiry sentence, and extracting and proposing reply information has been studied vigorously.

It is the technology of identifying an information request content for the input inquiry sentence that is one key to this inquiry-response technology. With the information request being identified, not only its content but also its grain differs, depending upon a domain assumed to be an object. For example, in the inquiry-response with an information appliance to be an object, various inquiries and replies, for example, how to use various functions associated with the information appliance, and how to solve a question or trouble, can be envisaged. In this case, it is grasped roughly or in details, responding to a necessity, which inquiry-reply the inputted inquiry sentence corresponds to.

One example of such a conventional technology of identifying the information request content is disclosed in Patent document 1. The Japanese inquiry message analysis device described in the Patent document 1 is configured of an inputting means for inputting a Japanese inquiry message, an information request sentence extracting means for extracting an information request sentence in which a portion used as a core of the information request has been stated from the message, and a Japanese basic analysis section for analyzing the information request sentence, and further a semantic structure analysis section for asking for a semantic structure of the information request sentence, a reference expression canceling means for canceling a reference expression of the request sentence, an information request structurizing means for structurizing main information requests in the message, and an outputting means for outputting the information request sentence.

More specifically, the above-mentioned Japanese inquiry message analysis device operates as follows. When the information request sentence extracting means extracts the information request sentence in which a portion used as a core of the information request has been stated from the inputted Japanese inquiry message, being an object of processing, by paying attention to a specific expression character string, the Japanese basic analysis section generates a syntax analysis result of the information request sentence by performing a syntax analysis process for the information request sentence. And, the semantic structure analysis section collates the syntax analysis result of the information request sentence obtained in the Japanese basic analysis section with a semantic structure pattern dictionary in which the syntax structure has been pre-described for a variation of the information request sentence. Thereby a semantic structure of the information request sentence is extracted. Further, the reference expression canceling means, when the reference expression is included in the information request sentence extracted by the information request sentence extracting means, cancels the above reference expression based upon a characteristic of the information request sentence. The information request structurizing means, when a plurality of the extracted information request sentences in which an information request to an identical object has been described, respectively, integrates a plurality of the structures of the above information request sentences, and structurizes the main information request contents in the Japanese inquiry message. Finally, the outputting means outputs the information request sentence integrated by the information request structurizing means.

Patent document 1: Japanese Patent Number 3358100

DISCLOSURE OF THE INVENTION

Problems to be Solved by the Invention

However, the above-mentioned related art has a point at issue that, when an unknown request sentence has been inputted, an erroneous semantic structure is extracted from the request sentence in some cases, and the extraction itself of the semantic structure fails in some cases, which is to be solved. The reason is that when the unknown request sentence has been inputted, the extraction of the semantic structure fails, or an erroneous semantic structure accompanied by erroneously collating the pattern is extracted because no appropriate semantic structure pattern exists.

Further, putting the applications in perspective such as an audio information search operation of identifying a request content from an audio-inputted information request or an operation request to provide request information, an audio inquiry-response, and an audio command for executing a request operation in addition to the above-mentioned inquiry-response technology, necessitates taking into consideration that the request sentence is audio-inputted.

Moreover, it is expected that, also when the request sentence has been inputted with the audio, likewise, the extraction of the semantic structure fails, or an erroneous semantic structure accompanied by erroneously collating the pattern is extracted. The reason is that an error in the syntax structure caused by an error in the request sentence occurs, and in addition hereto, the collation of the request sentence with the semantic structure pattern does not work correctly because a request sentence text being obtained with an audio recognition process originally has a tendency of containing an error.

The present invention has been accomplished in consideration of the above-mentioned circumstances, and an object thereof is to provide a request content identification system capable of identifying robustly and yet precisely the unknown request sentence and the request sentence inputted with audio.

Means to Solve the Problem

The 1st invention for solving the above-mentioned problems, which is an request content identification system for analyzing a request sentence (input request sentence) inputted in a natural language format and identifying a request content, is characterized in performing a syntax analysis for said input request sentence and identifying the request content by employing a common rule that does not depend upon the request content, and a request-unique rule unique to each request content.

The 2nd invention for solving the above-mentioned problems, which is a request content identification system for analyzing a request sentence (input request sentence) inputted in a natural language format and identifying a request content, is characterized in comprising: a common rule storing means for storing a common rule that does not depend upon the request content: a request-unique rule storing means for storing a request-unique rule unique to each request content: a request analysis processing means for performing a syntax analysis for the input request sentence by employing said common rule and said request-unique rule; and a request identification result generating means for generating an identification result of the request content from a result of said syntax analysis.

The 3rd invention for solving the above-mentioned problems, in the above-mentioned 2nd invention, is characterized in that: for said input request sentence, said request analysis processing means plurally generates analysis result candidates together with analysis scores indicative of a degree of adaptability to the request content previously prepared; and said request identification result generating means selects a most excellent analysis result candidate based upon said analysis score, and generates an identification result of the request content.

The 4th invention for solving the above-mentioned problems, in the above-mentioned 2nd invention, is characterized in that: said request content identification system further comprises an audio recognition processing means for generating an audio recognition result candidate by performing an audio recognition process for an audio-inputted input request sentence; for said audio recognition result candidate, said request analysis processing means plurally generates analysis result candidates together with analysis scores indicative of a degree of adaptability to the request content previously prepared; and said request identification result generating means selects a most excellent analysis result candidate based upon said analysis score, and generates an identification result of the request content.

The 5th invention for solving the above-mentioned problems, in the above-mentioned 3rd invention, is characterized in that: said request content identification system further comprises a request candidate score computing means for calculating an integration score tinged with an recognition score indicative of a degree of adaptability between an audio recognition result and an audio recognition result candidate in addition to said analysis score; and said request identification result generating means selects a most excellent analysis result candidate based upon said integration score.

The 6th invention for solving the above-mentioned problems, in the above-mentioned 3rd invention, is characterized in: said request content identification system further comprises: a similar document search processing means for performing a similarity search process of searching for a data resembling said input request sentence with at least one of a predetermined reply document data aggregation and a predetermined request sentence data aggregation assumed to be an object of search, and obtaining a search result candidate together with a search score indicative of a degree of adaptability to said input request sentence; and a request candidate score computing means for calculating an integration score tinged with said search score in addition to said analysis score; and said request identification result generating means selects a most excellent analysis result candidate based upon said integration score.

The 7th invention for solving the above-mentioned problems, in the above-mentioned 6th invention, is characterized in: said request content identification system further comprises an audio recognition processing means for generating an audio recognition result candidate by performing an audio recognition process for an audio-inputted input request sentence; said similar document search processing means performs a similarity search process of searching for a data resembling said audio recognition result candidate with at least one of a predetermined reply document data aggregation and a predetermined request sentence data aggregation assumed to be an object of search, and obtaining a search result candidate together with a search score indicative of a degree of adaptability to each said audio recognition result candidate; said request candidate score computing means calculates an integration score tinged with a recognition score indicative of a degree of adaptability to said audio recognition result candidate in addition to said analysis score and said search score; and said request identification result generating means selects a most excellent analysis result candidate based upon the above integration score.

The 8th invention for solving the above-mentioned problems, in one of the above-mentioned 2nd to 7th inventions, is characterized in that: said request-unique rule storing means stores said request-unique rules classified for each content; and said request analysis processing means performs a syntax analysis for the input request sentence by sequentially switching said common rule and said classified request-unique rule.

The 9th invention for solving the above-mentioned problems, in one of the above-mentioned 3rd to 8th inventions, is characterized in that: said request content identification system further comprises a request content cluster storing means for storing a request content cluster obtained by clustering the request contents resembling each other; and said request identification result generating means collects at least said analysis scores for each said request content cluster, selects a most excellent analysis result candidate cluster, and generates it as an identification result of the request content.

The 10th invention for solving the above-mentioned problems, which is a request content identification method of identifying a request content using a natural language format inputted into a computer comprising a common rule storing means for storing a common rule that does not depend upon a request content, and a request-unique rule storing means for storing a request-unique rule unique to each request content, is characterized in comprising:

a step in which said computer performs a syntax analysis for a request sentence (an input request sentence) by employing said common rule and said request-unique rule; and a step in which said computer generates an identification result of the request content from a result of said syntax analysis.

The 11th invention for solving the above-mentioned problems, which is a program for causing: a computer comprising a common rule storing means for storing a common rule that does not depend upon a request content, and a request-unique rule storing means for storing a request-unique rule unique to each request content to execute: a process of performing a request analysis for an inputted request sentence (an input request sentence) using a natural language by employing said common rule and said request-unique rule; and a process of generating an identification result of the request content from a result of said syntax analysis; and the above computer to function as a means for identifying the request content having a natural language format.

An Advantageous Effect of the Invention

With the present invention, also in the case that the unknown request sentence has been inputted in some cases and the request sentence has been inputted with audio in some cases, it becomes possible to obtain an information request identification result that has few failures or errors in the request identification caused by these influences, and yet is robust and precise. The reason lies in a point that a configuration has been made so as to apply the foregoing common rule and request-unique rule, to suppress an identification error accompanied by applying an erroneous rule at a minimum level also for the unknown request sentence, and to obtain the identification result for which validity of the syntax structure of the request sentence or validity of the identification result of the request has been guaranteed.

BRIEF DESCRIPTION OF THE DRAWINGS

FIG. 14 shows one example (one part) of the common rule and the request content-unique rule for explaining the example of the present invention.

FIG. 15 is a view illustrating a specific example of the request analysis result for an information request sentence text (information request sentence audio data) $r_A$ for explaining the example of the present invention.

FIG. 16 is a view illustrating a specific example of the request analysis result for an information request sentence text (information request sentence audio data) $r_B$ for explaining the example of the present invention.

FIG. 17 is a view signifying one example of information (table) being stored in a request candidate score table storing means of the request content identification system relating to the present invention.

FIG. 18 is a view for explaining an integration score being calculated by a request candidate score computing means of the request content identification system relating to the present invention.

FIG. 19 is a view signifying a relation between the information request sentence of FIG. 13 and a similar document search score in the case of having made a similarity search to the content stored by a reply request data storing means.

FIG. 20 is a view for explaining an integration score being calculated by a request candidate score computing means of the request content identification system relating to the present invention.

FIG. 21 is a view illustrating a specific example of the request analysis result for an information request sentence text (information request sentence audio data) $r_C$ for explaining the example of the present invention.

FIG. 22 is a view signifying one example of information (table) being stored in the request candidate score table storing means of the request content identification system relating to the present invention.

FIG. 23 is a view for explaining an integration score being calculated by the request candidate score computing means of the request content identification system relating to the present invention.

FIG. 24 shows another example (one part) of the common rule and the request content-unique rule for explaining the example of the present invention.

FIG. 25 is a view illustrating a specific example of the request analysis result for the information request sentence text (information request sentence audio data) $r_A$ for explaining the example of the present invention.

FIG. 26 shows another example of the information request sentence text (information request sentence audio data) for explaining the example of the present invention.

FIG. 27 shows a specific example of information being stored in a multi-hierarchal request content cluster storing means of the request content identification system relating to the present invention.

FIG. 28 shows another example (one part) of the common rule and the request content-unique rule for explaining the example of the present invention.

FIG. 29 is a view illustrating a specific example of the request analysis result for the information request sentence text (information request sentence audio data) $r_A$ for explaining the example of the present invention.

FIG. 30 is a view illustrating a specific example of the request analysis result for an information request sentence text (information request sentence audio data) $r_D$ for explaining the example of the present invention.

Figure 1:
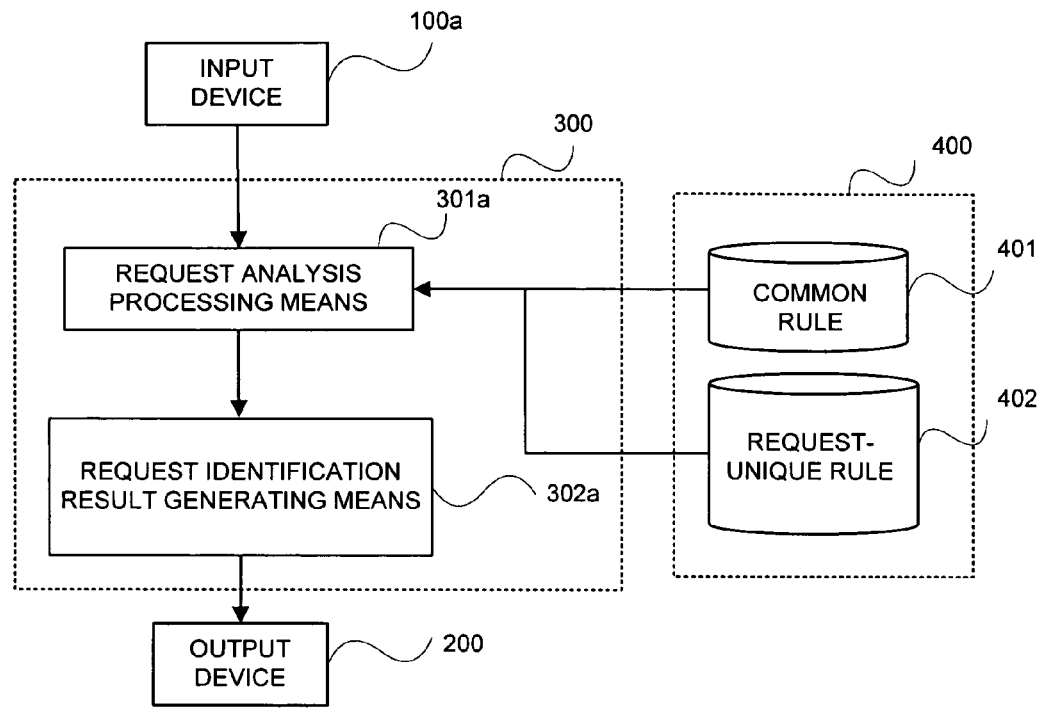
FIG. 1 is a block diagram signifying a configuration of the request content identification system relating to a first embodiment of the present invention.

DESCRIPTION OF NUMERALS 100a and 100b input devices
200 output device
300 computer (central processing unit; processor; data processing device)
301a, 301b, 301c, and 301d request analysis processing means
302a, 302b, and 302c request identification result generating means
303 audio recognition processing means
304a, 304b, and 304c request candidate score computing means
305a and 305b similar document search processing means
306a and 306b rule switching means
400 record medium
401 common rule storing means
402a and 402b request-unique rule storing means
403 request candidate score table storing means
404 reply request data storing means
405 request content multi-hierarchy cluster storing means
406 request cluster-unique rule storing means

BEST MODE FOR CARRYING OUT THE INVENTION

First Embodiment

A first embodiment of the present invention will be explained in details by making a reference to the accompanied drawings. FIG. 1 is a block diagram signifying a configuration of the request content identification system relating to the first embodiment of the present invention. Upon making a reference to FIG. 1, the request content identification system relating to this embodiment is configured of an input device 100a, an output device 200, a computer (central processing unit; processor; data processing device) 300 that operates under control of a program, and a record medium 400.

The computer (central processing unit; processor; data processing device) 300 includes and is configured of a request analysis processing means 301a and a request identification result generating means 302a, each of which is configured of a computer program.

The request analysis processing means 301a is a means for performing a request analysis process for a text data of the inputted information request sentence by employing the common rule stored in a common rule storing means 401, and the request-unique rule stored in a request-unique rule storing means 402, and generating a syntax structure for the input request sentence, thereby to output a list of a request content number and its request analysis score for the input request sentence as plural request analysis result candidates for the input request sentence.

The request identification result generating means 302a is a means for sorting out the candidates of the request content numbers for the input request sentence of the list outputted by the request analysis processing means 301a in the descending order of the score, and generating and outputting the request content number having a highest score as an identification result.

The record medium 400 includes the common rule storing means 401 and the request-unique rule storing means 402. The common rule storing means 401 stores rules (common rules) for the syntax analysis described so as not to depend upon the unique request content, which are employed at the moment of performing a request analysis for the input request sentence in the request analysis processing means 301a. The request-unique rule storing means 402 stores rules (request-unique rules) for the syntax analysis described by exclusively using a vocabulary and an expression unique to the unique request content, which are employed at the moment of performing a request analysis for the input request sentence in the request analysis processing means 301a.

Figure 2:
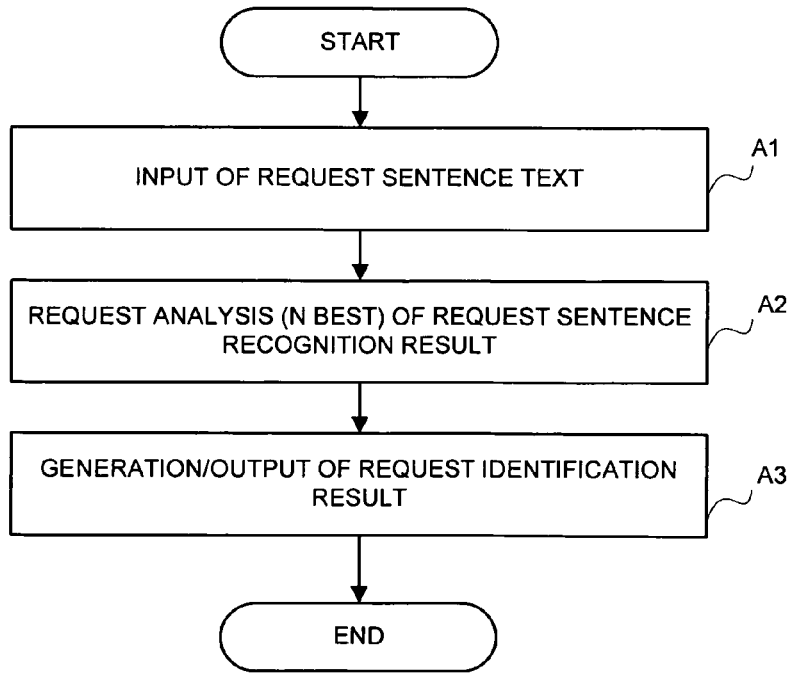
FIG. 2 is a flowchart signifying an operation of the request content identification system relating to the first embodiment of the present invention.

An operation of this embodiment will be explained in details by making a reference to the accompanied drawings. FIG. 2 is a flowchart signifying an operation of the request content identification system relating to the first embodiment of the present invention. Upon making a reference to FIG. 2, at first, when the text data of the information request sentence is inputted by the input device 100a (step A1), the request analysis processing means 301a performs a request analysis process for the text data of the inputted information request sentence by employing the common rule stored in the common rule storing means 401 and the request-unique rule stored in the request-unique rule storing means 402, and generates a syntax structure for the input request sentence, thereby to output a list (N best) of a request content number and an analysis score indicative of a degree of adaptability in the syntax analysis to each request content as plural request analysis result candidates for the input request sentence (step A2).

The request identification result generating means 302a sorts out all candidates of the input request sentence obtained in the request analysis processing means 301a in the descending order of the score, generates the request content number having a highest score as an identification result, and sends it to the output device 200 (step A3).

As mentioned above, with this embodiment, the identification result for which validity of the syntax structure of the inputted information request sentence or validity of the identification result of the request have been guaranteed is obtained because the selection based upon the above-mentioned analysis score is enabled. Further, also for the unknown request sentence, it is possible to suppress an identification error accompanied by applying an erroneous rule at a minimum level, and to realize identification of the request from the information request sentence having an excellent precision.

Second Embodiment

Figure 3:
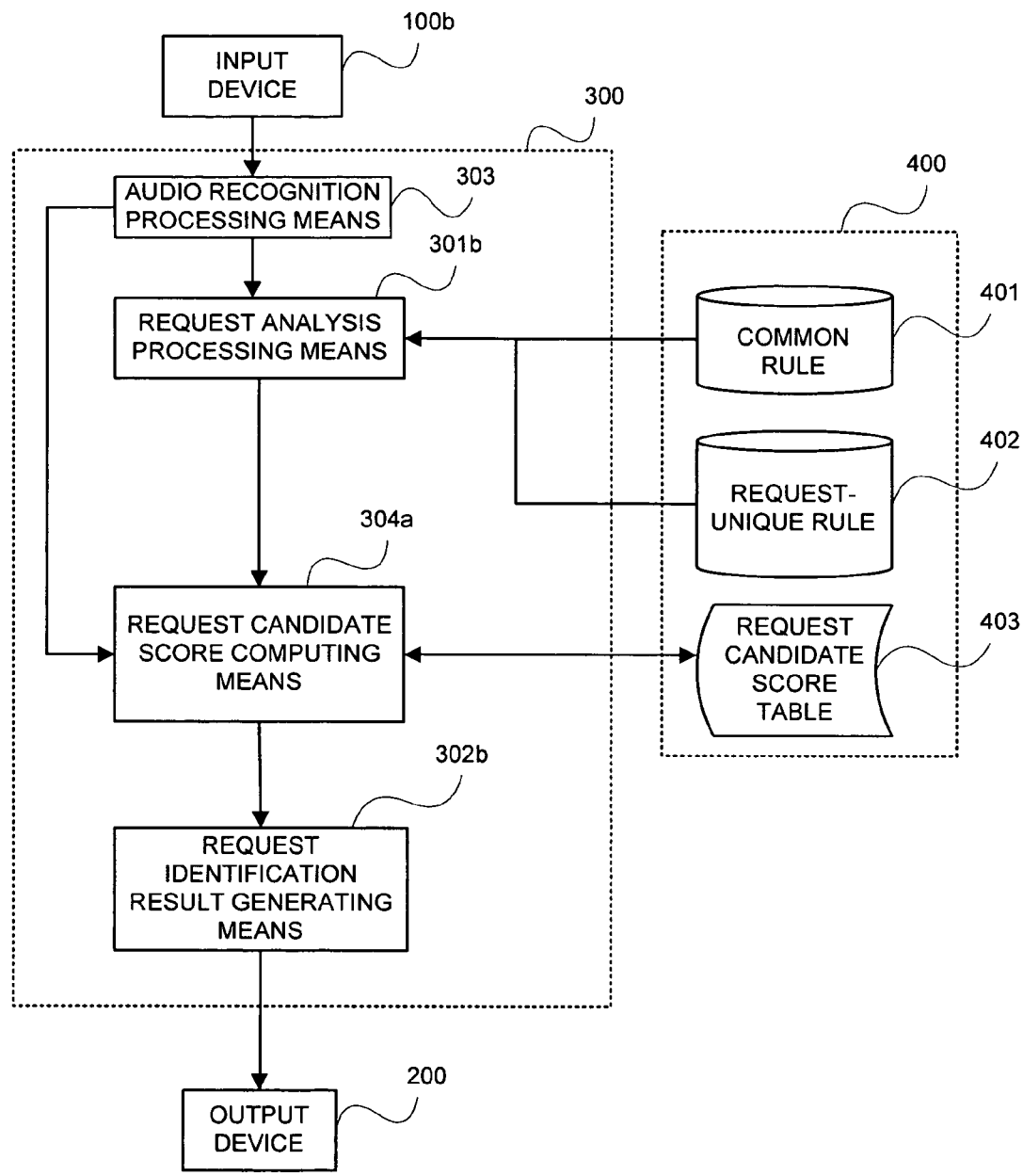
FIG. 3 is a block diagram signifying a configuration of the request content identification system relating to a second embodiment of the present invention.

A second embodiment of the present invention, which enables the information request sentence inputted with the audio to be identified, will be explained in detail by making a reference to the accompanied drawings. FIG. 3 is a block diagram signifying a configuration of the request content identification system relating to the second embodiment of the present invention. Upon making a reference to FIG. 3, the request content identification system relating to this embodiment is configured of an input device 100b, an output device 200, a computer (central processing unit; processor; data processing device) 300 that operates under control of a program, and a record medium 400.

A difference point with the above-mentioned first embodiment is a point that the input device 100b is an audio input device, a configuration of the computer (central processing unit; processor; data processing device) 300, and a point that a request candidate score table storing means 403 has been added to the record medium 400. Hereinafter, an explanation is made with the portion that is in common with the above-mentioned first embodiment omitted.

The computer (central processing unit; processor; data processing device) 300 in this embodiment includes and is configured of an audio recognition processing means 303, a request analysis processing means 301b, a request candidate score computing means 304a, and a request identification result generating means 302b, each of which is configured of a computer program.

The audio recognition processing means 303 is a means for performing an audio recognition process for the audio data of the inputted information request sentence, and plurally outputting the information request sentence text, being an candidate, to which an audio recognition score indicative of a degree of adaptability to the information request sentence text previously prepared has been affixed, as an audio recognition result for the input request sentence.

The request analysis processing means 301b is a means for performing a request analysis process for each audio recognition result candidate obtained in the audio recognition processing means 303 by employing the common rule stored in the common rule storing means 401 and the request-unique rule stored in the request-unique rule storing means 402, and generating a syntax structure for each audio recognition result candidate, thereby to output a list of the request content number and its request analysis score for each audio recognition result candidate as plural request analysis result candidates for each recognition result candidate The request candidate score computing means 304a records each audio recognition result candidate and its audio recognition score obtained in the audio recognition processing means 303, and the request content number and its request analysis score obtained in the request analysis processing means 301b in the request candidate score table storing means 403. In addition hereto, the request candidate score computing means 304a is a means for combining the audio recognition score of each above-mentioned audio recognition result candidate, the request content number, and its request analysis score, thereby to compute an integration score for each of all candidates of the request contents for the inputted information request sentence, and outputting the integration scores together with the request content numbers to the request identification result generating means 302b.

The request identification result generating means 302b is a means for sorting out all candidates of the input request sentence outputted by the request candidate score computing means 304a in the descending order of the integration score, and generating and outputting the request content number having a highest integration score as an identification result.

The request candidate score table 403 records each audio recognition result candidate and its audio recognition score obtained in the audio recognition processing means 303 in the request candidate score computing means 304a, and stores a request candidate score table that is employed at the moment of recoding the request content number and its request analysis score obtained with the request analysis process performed for each audio recognition result candidate by the request analysis processing means 301b (see FIG. 17).

Figure 4:
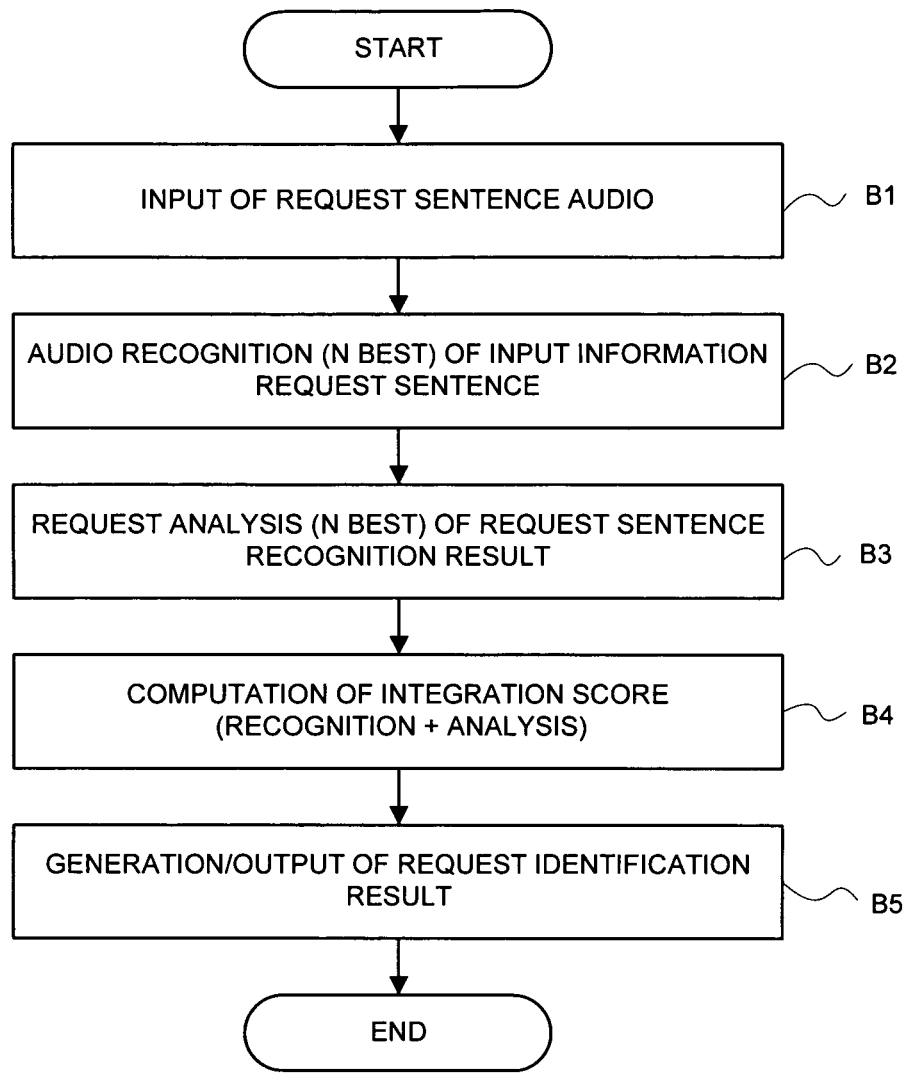
FIG. 4 is a flowchart signifying an operation of the request content identification system relating to the second embodiment of the present invention.

An operation of this embodiment will be explained in detail by making a reference to the accompanied drawings. FIG. 4 is a flowchart signifying an operation of the request content identification system relating to the second embodiment of the present invention. Upon making a reference to FIG. 4, at first, when the information request sentence audio is inputted by the input device 100b (step B1), the audio recognition processing means 303 performs an audio recognition process for the audio data of the inputted information request sentence, and plurally outputs the information request sentence text (N best), being a candidate, to which the audio recognition score has been affixed, as an audio recognition result for the inputted information request sentence (step B2; an example: $r_A$ to $r_C$ of FIG. 13).

The request analysis processing means 301b performs a request analysis process for each audio recognition result candidate obtained in the audio recognition processing means 303 by employing the common rule stored in the common rule storing means 401 and the request-unique rule stored in the request-unique rule storing means 402, and generates a syntax structure for each audio recognition result candidate, thereby to output a list of the request content number and its request analysis scores for each recognition result candidate as plural request analysis result candidates (N best) for each audio recognition result candidate (step B3).

For each audio recognition result candidate obtained in the audio recognition processing means 303, the request candidate score computing means 304a, together with its audio recognition score, records the request content number and its request analysis score obtained in the request analysis processing means 301b in the request candidate score table storing means 403, and in addition hereto, combines the audio recognition score and the request analysis score for each audio recognition result candidate, thereby to compute an integration score for each of all candidates of the request contents for the inputted information request sentence, and to output the request content numbers together with the integration scores (step B4).

Finally, the request identification result generating means 302b sorts out all candidates of the input request sentence obtained by the request candidate score computing means 304a in the descending order of the integration score, generates the request content number having a highest integration score as an identification result, and sends it to the output device 200 (step B5).

As mentioned above, this embodiment makes it possible to obtain an optimal identification result of the inquiry content by complementarily employing the results of the audio recognition and the request analysis because the integration score obtained by combining the audio recognition score and the request candidate score is employed. Further, this embodiment makes it possible to suppress an influence caused by an audio recognition error at a minimum level, and to realize identification of the request from the information request sentence having an excellent precision because dispersion in the audio recognition process is taken into consideration.

Third Embodiment

Figure 5:
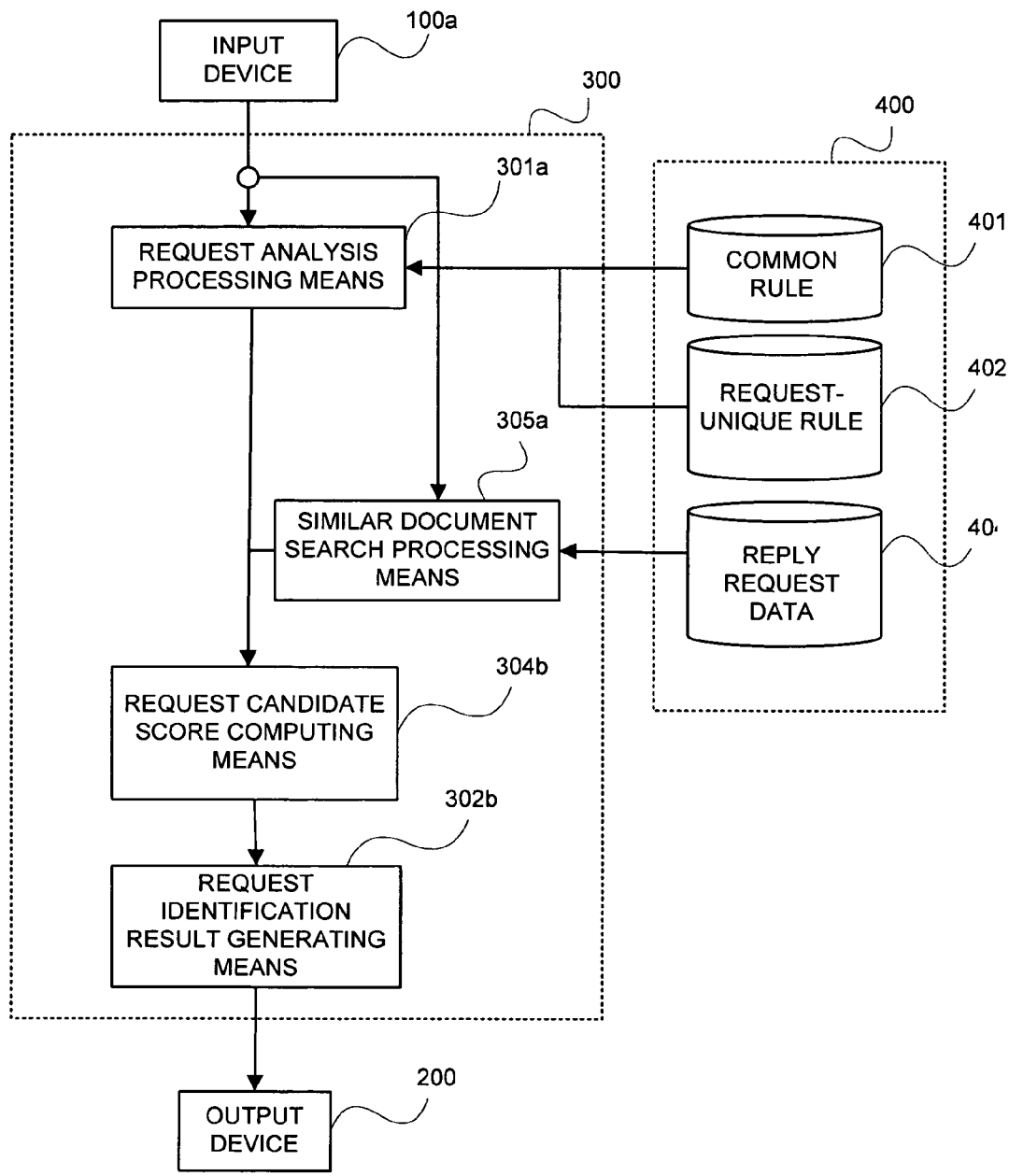
FIG. 5 is a block diagram signifying a configuration of the request content identification system relating to a third embodiment of the present invention.

A third embodiment of the present invention obtained by improving the above-mentioned first embodiment will be explained in details by making a reference to the accompanied drawings. FIG. 5 is a block diagram signifying a configuration of the request content identification system relating to the third embodiment of the present invention. Upon making a reference to FIG. 5, the request content identification system relating to this embodiment is configured of an input device 100a, an output device 200, a computer (central processing unit; processor; data processing device) 300 that operates under control of a program, and a record medium 400.

A difference point with the above-mentioned first embodiment is a configuration of the computer (central processing unit; processor; data processing device) 300, and a point that a reply request data storing means 404 has been added to the record medium 400. Hereinafter, an explanation is made with the portion that is in common with the above-mentioned first and second embodiments omitted.

The computer (central processing unit; processor; data processing device) 300 in this embodiment includes and is configured of a request analysis processing means 301a, a request candidate score computing means 304b, a similar document search processing means 305a, and a request identification result generating means 302b, each of which is configured of a computer program.

The request analysis processing means 301a, similarly to that of the above-mentioned first embodiment, is a means for performing a request analysis process for the text data of the inputted information request sentence by employing the common rule stored in the common rule storing means 401 and the request-unique rule stored in the request-unique rule storing means 402, and generating a syntax structure for the input request sentence, thereby to output a list of the request content number and its request analysis score for the input request sentence as plural request analysis result candidates for the input request sentence.

The similar document search processing means 305a is a means for searching for the text data of the inputted information request sentence as a search request with a reply document aggregation for each request content stored in the reply request data storing means 404, an information request sentence aggregation for each request content, or a both thereof assumed to be an object, obtaining the request content number and a similar document search score indicative of a degree of adaptability to the information request sentence as a search result, and outputting a set of the request content number and its similar document search score.

The request candidate score computing means 304b in this embodiment is almost similar to the request candidate score computing means 304a of the above-mentioned second embodiment; however it differs in a point of computing an integration score by employing the similar document search score instead of the audio recognition score. That is, the request candidate score computing means 304b is a means for combining the request content number obtained by the similar document search processing means 305a, its similar document search score, and the request analysis score for each candidate of the request content number obtained by the request analysis processing means 301a and its request analysis score, thereby to compute an integration score for each of all candidates of the request contents for the inputted information request sentence, and to output the request content numbers together with the integration scores.

The request identification result generating means 302b is a means for sorting out all candidates of the input request sentence obtained by the request candidate score computing means 304b in the descending order of the integration score, and generating and outputting the request content number having a highest integration score as an identification result.

The reply request data storing means 404 is a means for storing the document data that becomes an object of the search at the moment that the similar document search processing means 305a searches for the data resembling the input request sentence. For example, the reply document aggregation or/and the information request sentence aggregation for each request content is stored.

Figure 6:
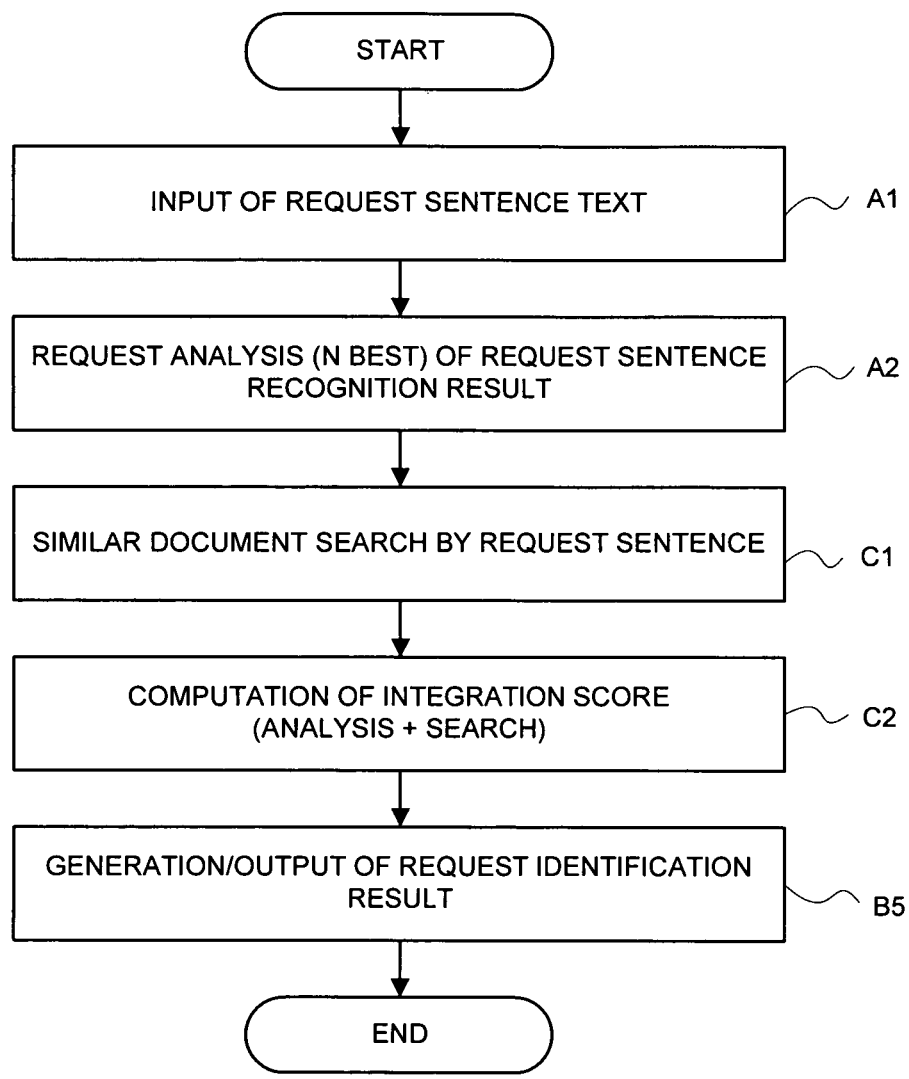
FIG. 6 is a flowchart signifying an operation of the request content identification system relating to the third embodiment of the present invention.

An operation of this embodiment will be explained in details by making a reference to the accompanied drawings. FIG. 6 is a flowchart signifying an operation of the request content identification system relating to the third embodiment of the present invention. Upon making a reference to FIG. 6, at first, when the text data of the information request sentence is inputted by the input device 100a (step A1), the request analysis processing means 301a performs a request analysis process for the text data of the inputted information request sentence by employing the common rule stored in the common rule storing means 401 and the request-unique rule stored in the request-unique rule storing means 402, and generates a syntax structure for the input request sentence, thereby to output a list of the request content number and its request analysis score for the input request sentence as plural request analysis result candidates (N best) for the input request sentence (step A2).

The similar document search processing means 305a performs a similar document search for the text data of the information request sentence inputted in the step A1 as a search request with the document data stored in the reply request data storing means 404 assumed to be an object, obtains the request content number and the similar document search score as a search result, and outputs a set of the request content number and its similar document search score (step C1).

The request candidate score computing means 304b combines the request content number obtained by the request analysis processing means 301a and its request analysis score, and the request content number obtained by the similar document search processing means 305a and its similar document search score for the text data of the inputted information request sentence, thereby to compute an integration score for each of all candidates of the request contents for the input request sentence, and to output the request content numbers together with the integration scores (step C2).

Finally, the request identification result generating means 302b sorts out all candidates of the input request sentence obtained by the request candidate score computing means 304b in the descending order of the integration score, generates the request content number having a highest integration score as an identification result, and sends it to the output device 200 (step B5).

As mentioned above, this embodiment makes it possible to obtain an optimal identification result of the inquiry content by complementarily employing the results of the request analysis and the similar document search because the integration score obtained by combining the similar document search score and the request candidate score is employed. Further, this embodiment as well makes it possible to suppress an influence caused by the unknown request sentence and the audio recognition error at a minimum level, and to realize identification of the request from the information request sentence having an excellent precision.

Fourth Embodiment

Figure 7:
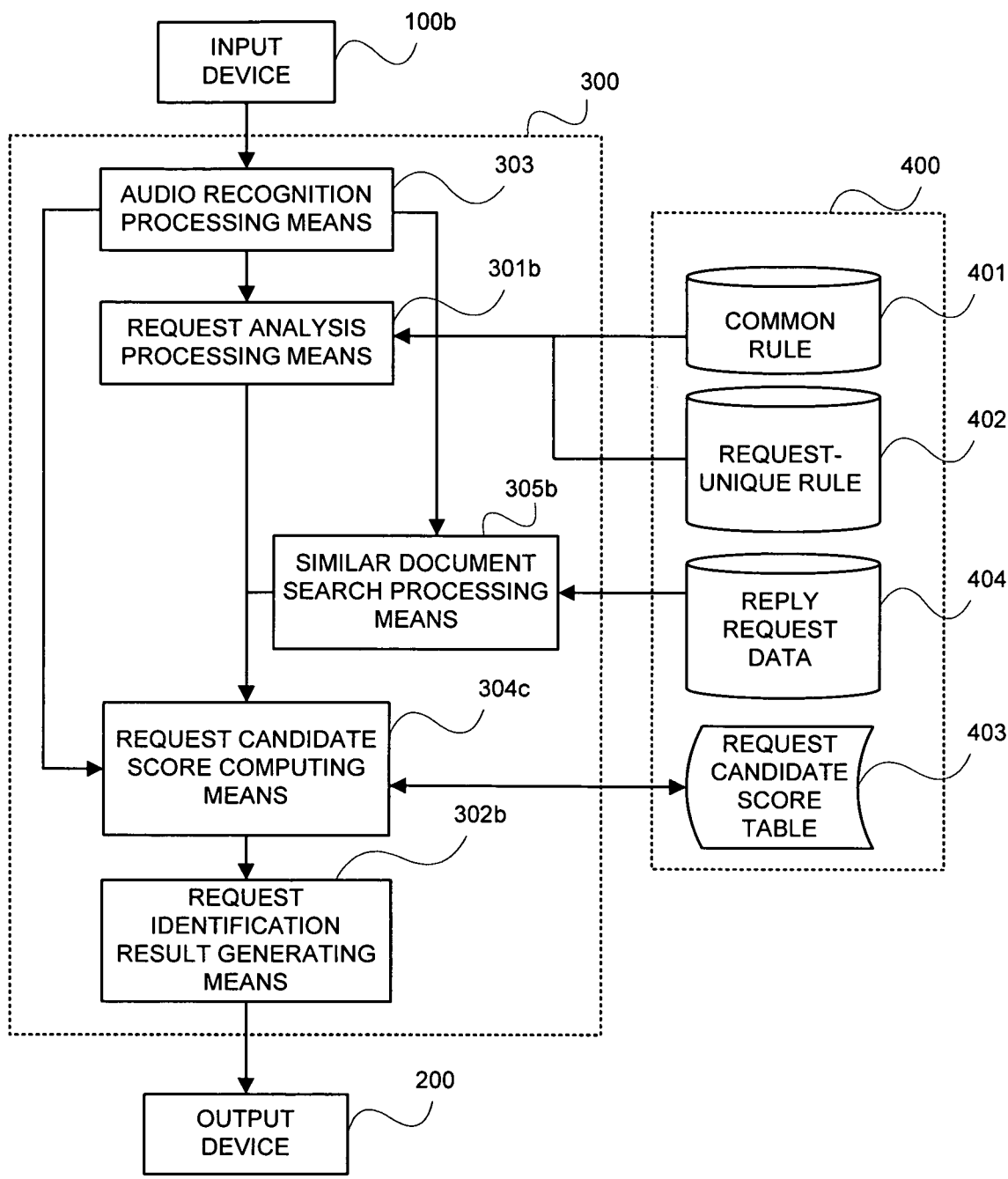
FIG. 7 is a block diagram signifying a configuration of the request content identification system relating to a fourth embodiment of the present invention.

A fourth embodiment of the present invention obtained by improving the above-mentioned second embodiment will be explained in detail by making a reference to the accompanied drawings. FIG. 7 is a block diagram signifying a configuration of the request content identification system relating to the fourth embodiment of the present invention. Upon making a reference to FIG. 7, the request content identification system relating to this embodiment is configured of an input device 100b, an output device 200, a computer (central processing unit; processor; data processing device) 300 that operates under control of a program, and a record medium 400.

A difference point with the above-mentioned second embodiment is a configuration of the computer (central processing unit; processor; data processing device) 300, and a point that the reply request data storing means 404 explained in the above-mentioned third embodiment has been added to the record medium 400. Hereinafter, an explanation is made with the portion that is in common with the above-mentioned second and third embodiments omitted.

The computer (central processing unit; processor; data processing device) 300 in this embodiment includes and is configured of an audio recognition processing means 303, a request analysis processing means 301b, a request candidate score computing means 304c, a similar document search processing means 305b, and a request identification result generating means 302b, each of which is configured of a computer program.

The audio recognition processing means 303, as explained in the above-mentioned second embodiment, is a means for performing an audio recognition process for the audio data of the inputted information request sentence and plurally outputting the information request sentence text, being a candidate, to which the audio recognition score has been affixed, as an audio recognition result for the input request sentence.

The request analysis processing means 301b, as explained in the above-mentioned second embodiment, is a means for performing a request analysis process for each audio recognition result candidate obtained in the audio recognition processing means 303 by employing the common rule stored in the common rule storing means 401 and the request-unique rule stored in the request-unique rule storing means 402, and generating a syntax structure for each audio recognition result candidate, thereby to output a list of the request content number and its request analysis score for each recognition result candidate as plural request analysis result candidates for each audio recognition result candidate.

The similar document search processing means 305b is a means for searching for each audio recognition result candidate obtained by the audio recognition processing means 303 as a search request with the reply document aggregation for each request content stored in the reply request data storing means 404, the information request sentence aggregation for each request content, or a both thereof assumed to be an object, obtaining the request content number and its similar document search score as a search result, and outputting a set of the request content number and its similar document search score.

The request candidate score computing means 304c records each audio recognition result candidate and its audio recognition score obtained in the audio recognition processing means 303, the request content number and its request analysis score obtained in the request analysis processing means 301b, and the request content number and its similar document search score obtained by the similar document search processing means 305b in the request candidate score table storing means 403. In addition hereto, the request candidate score computing means 304c is a means for combining the audio recognition score of each above-mentioned audio recognition result candidate, the above-mentioned request content number, its request analysis score, and the similar document search score, thereby to compute an integration score for each of all candidates of the request contents for the inputted information request sentence, and outputting the integration scores together with the request content numbers to the request identification result generating means 302b.

The request identification result generating means 302b is a means for sorting out all candidates of the input request sentence outputted by the request candidate score computing means 304c in the descending order of the integration score, and generating and outputting the request content number having a highest integration score as an identification result.

The request candidate score table 403 and the reply request data storing means 404 were explained in the second embodiment and the third embodiment, respectively, so its explanation is omitted.

Figure 8:
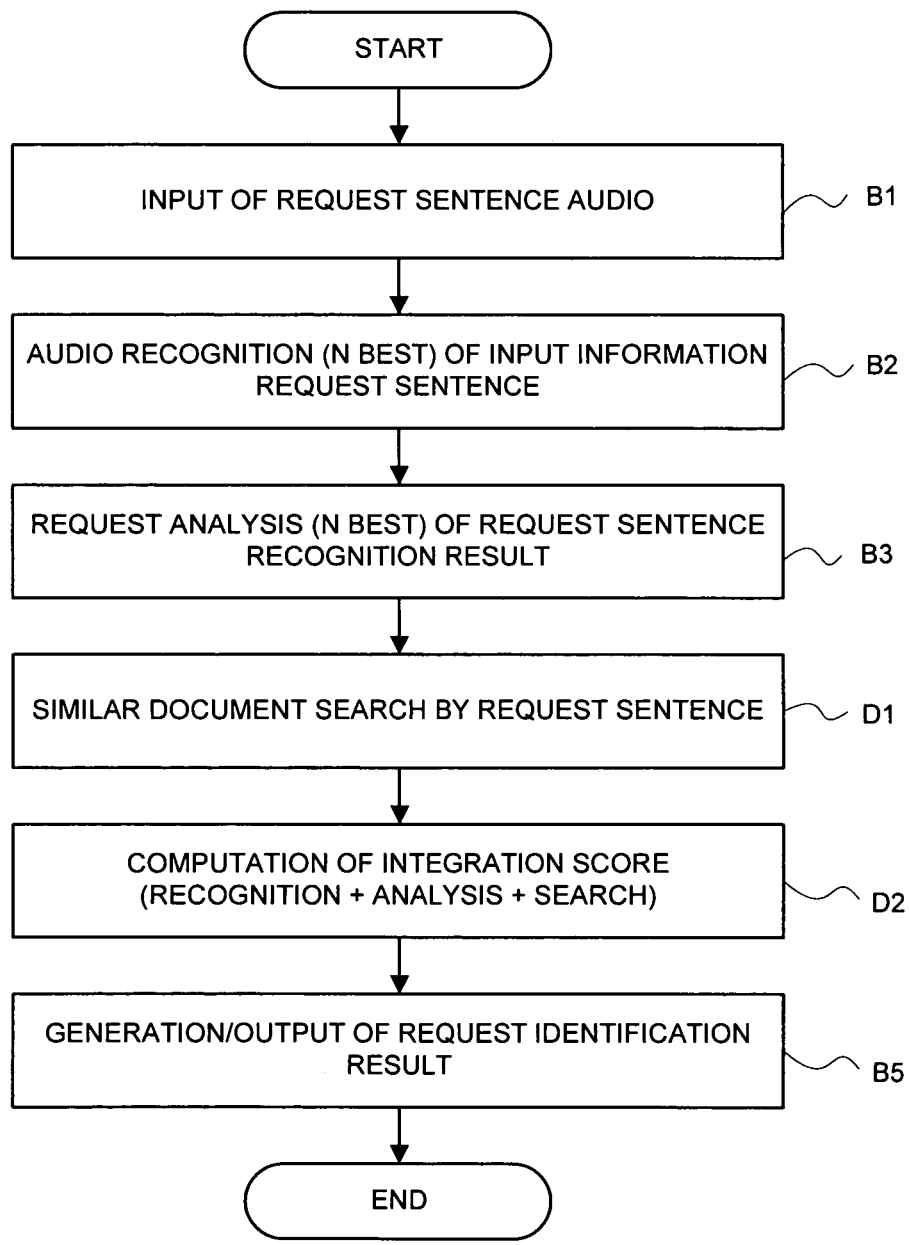
FIG. 8 is a flowchart signifying an operation of the request content identification system relating to the fourth embodiment of the present invention.

An operation of this embodiment will be explained in details by making a reference to the accompanied drawings. FIG. 8 is a flowchart signifying an operation of the request content identification system relating to the fourth embodiment of the present invention. Upon making a reference to FIG. 8, at first, when the information request sentence audio is inputted by the input device 100b (step B1), the audio recognition processing means 303 performs an audio recognition process for the audio data of the inputted information request sentence, and plurally outputs the information request sentence text (N best), being a candidate, to which the audio recognition score has been affixed, as an audio recognition result for the inputted information request sentence (step B2; an example: $r_A$ to $r_C$ of FIG. 13).

The request analysis processing means 301b performs a request analysis process for each audio recognition result candidate obtained in the audio recognition processing means 303 by employing the common rule stored in the common rule storing means 401 and the request-unique rule stored in the request-unique rule storing means 402, and generates a syntax structure for each audio recognition result candidate, thereby to output a list of the request content number and its request analysis score for each recognition result candidate as plural request analysis result candidates (N best) for each audio recognition result candidate (step B3).

The similar document search processing means 305b performs a similar document search for each audio recognition result candidate obtained by the audio recognition processing means 303 as a search request with the document data stored in the reply request data storing means 404 assumed to be an object, obtains the request content number and the similar document search score as a search result, and outputs a set of the request content number and its similar document search score (step D1).

For each audio recognition result candidate obtained in the audio recognition processing means 303, the request candidate score computing means 304c, together with its audio recognition score, records the request content number and its request analysis score obtained in the request analysis processing means 301b, the request content number and its similar document search score obtained by the similar document search processing means 305b in the request candidate score table storing means 403, and in addition hereto, combines the audio recognition score, the request analysis score, and the similar document search score for each audio recognition result candidate, thereby to compute an integration score for each of all candidates of the request content for the inputted information request sentence, and to output the request content numbers together with the integration scores (step D2).

Finally, the request identification result generating means 302b sorts out all candidates of the input request sentence obtained by the request candidate score computing means 304c in the descending order of the integration score, generates the request content number having a highest integration score as an identification result, and sends it to the output device 200 (step B5).

As mentioned above, this embodiment makes it possible to suppress an influence caused by an audio recognition error at a minimum level, and to obtain an optimal identification result of the inquiry content by complementarily employing the results of the audio recognition, the request analysis, and the similar document search because the integration score obtained by combining the audio recognition score, the request candidate score, and the similar document search score is employed.

Fifth Embodiment

Figure 9:
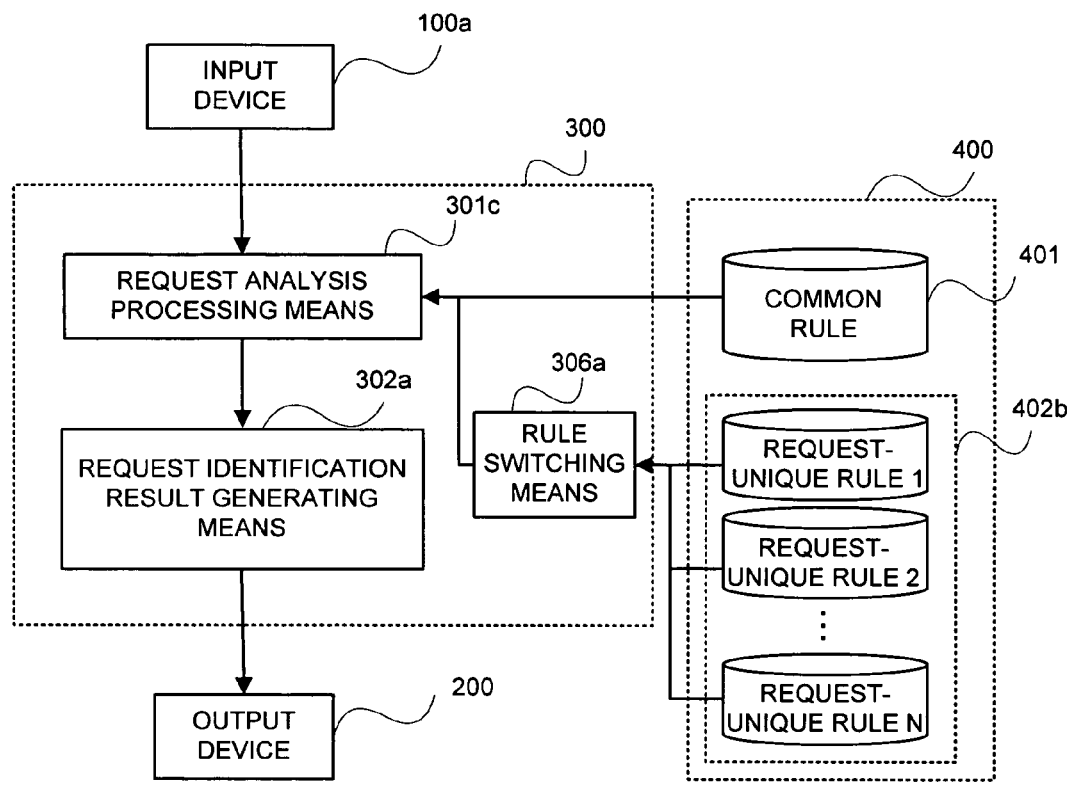
FIG. 9 is a block diagram signifying a configuration of the request content identification system relating to a fifth embodiment of the present invention.

A fifth embodiment of the present invention will be explained in detail by making a reference to the accompanied drawings. FIG. 9 is a block diagram signifying a configuration of the request content identification system relating to the fifth embodiment of the present invention. Upon making a reference to FIG. 9, the request content identification system relating to this embodiment is configured of an input device 100a, an output device 200, a computer (central processing unit; processor; data processing device) 300 that operates under control of a program, and a record medium 400.

A difference point with the above-mentioned first embodiment is a point that a rule switching means 306a has been added to a configuration of the computer (central processing unit; processor; data processing device) 300, and a point of including a request-unique rule storing means 402b for distinctively storing the corresponding request-unique rules request content by request content in such a manner of a request-unique rule 1, a request-unique rule 2, . . . , and a request-unique rule N instead of the request-unique rule storing means 402 for storing the request-unique rules explained in the first embodiment in a lump.

The computer (central processing unit; processor; data processing device) 300 includes and is configured of a request analysis processing means 301c, a rule switching means 306a, and a request identification result generating means 302a, each of which is configured of a computer program.

The request analysis processing means 301c is a means for performing a request analysis process for the text data of the inputted information request sentence by employing the common rule stored in the common rule storing means 401, and the request-unique rule that the rule switching means 306a sequentially switches, out of all request-unique rules, i.e. the request-unique rule 1, the request-unique rule 2, . . . , and the request-unique rule N stored request content by request content in the request-unique rule storing means 402b, and generates a syntax structure for the input request sentence by sequentially employing one rule, out of the common rule and all request-unique rules, thereby to output a list of the request content number and its request analysis score for the input request sentence as plural request analysis result candidates for the input request sentence.

The request identification result generating means 302a is a means for sorting out the candidates of the request content numbers for the input request sentence of the list outputted by the request analysis processing means 301c in the descending order of the score, and generating and outputting the request content number having a highest score as an identification result.

The rule switching means 306a sequentially makes a switchover to any of all of N request-unique rules, i.e. the request-unique rule 1, the request-unique rule 2, . . . , and the request-unique rule N stored in the request-unique rule storing means 402b, thereby to provide the request-unique rule being employed for the request analysis process to the request analysis processing means 301c.

The record medium 400 includes the common rule storing means 401 and the request-unique rule storing means 402b. The common rule storing means 401 stores the rules (common rules) for the syntax analysis described so as not to depend upon the unique request content, which are employed at the moment of performing a request analysis for the input request sentence in the request analysis processing means 301c. The request-unique rule storing means 402b takes the rules (request-unique rules) for the syntax analysis described by exclusively using a vocabulary and an expression unique to the unique request content, which are employed at the moment of performing a request analysis for the input request sentence in the request analysis processing means 301c, to be a corresponding request-unique rule request content by request content, and distinctively stores all of N request-unique rules, i.e. the request-unique rule 1, the request-unique rule 2, . . . , and the request-unique rule N.

Figure 10:
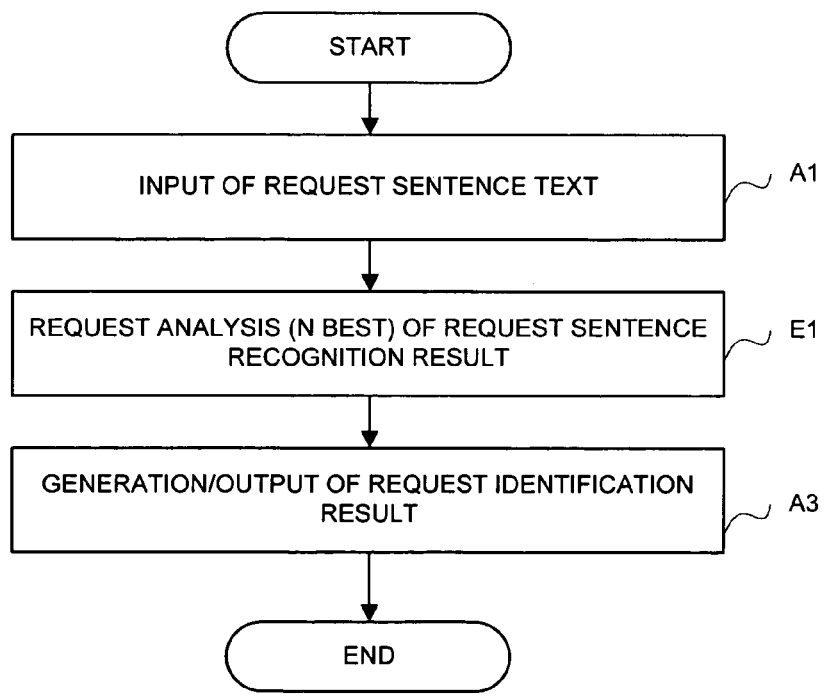
FIG. 10 is a flowchart illustrating an operation of the request content identification system relating to the fifth embodiment of the present invention.

An operation of this embodiment will be explained in details by making a reference to the accompanied drawings. FIG. 10 is a flowchart signifying an operation of the request content identification system relating to the fifth embodiment of the present invention. Upon making a reference to FIG. 10, at first, when the text data of the information request sentence is inputted by the input device 100a (step A1), the request analysis processing means 301c performs a request analysis process for the text data of the inputted information request sentence by employing the common rule stored in the common rule storing means 401, and the request-unique rule that the rule switching means 306a sequentially switches, out of all request-unique rules, i.e. the request-unique rule 1, the request-unique rule 2, . . . , and the request-unique rule N stored request content by request content in the request-unique rule storing means 402b, and generates a syntax structure for the input request sentence by sequentially employing one rule, out of the common rule and all request-unique rules, thereby to output a list (N best) of the request content number and the analysis score indicative of a degree of adaptability in the syntax analysis to each request content for the input request sentence as plural request analysis result candidates for the input request sentence (step E1).

The request identification result generating means 302a sorts out all candidates for the input request sentence obtained by the request analysis processing means 301c in the descending order of the score, generates the request content number having a highest score as an identification result, and sends it to the output device 200 (step A3).

As mentioned above, with this embodiment, similarly to the first embodiment, the identification result for which validity of the syntax structure of the inputted information request sentence or validity of the identification result of the request has been guaranteed is obtained because the selection based upon the above-mentioned analysis score is enabled. Further, also for the unknown request sentence, this embodiment makes it possible to suppress an identification error accompanied by applying an erroneous rule at a minimum level, and to realize identification of the request from the information request sentence having an excellent precision.

Sixth Embodiment

Figure 11:
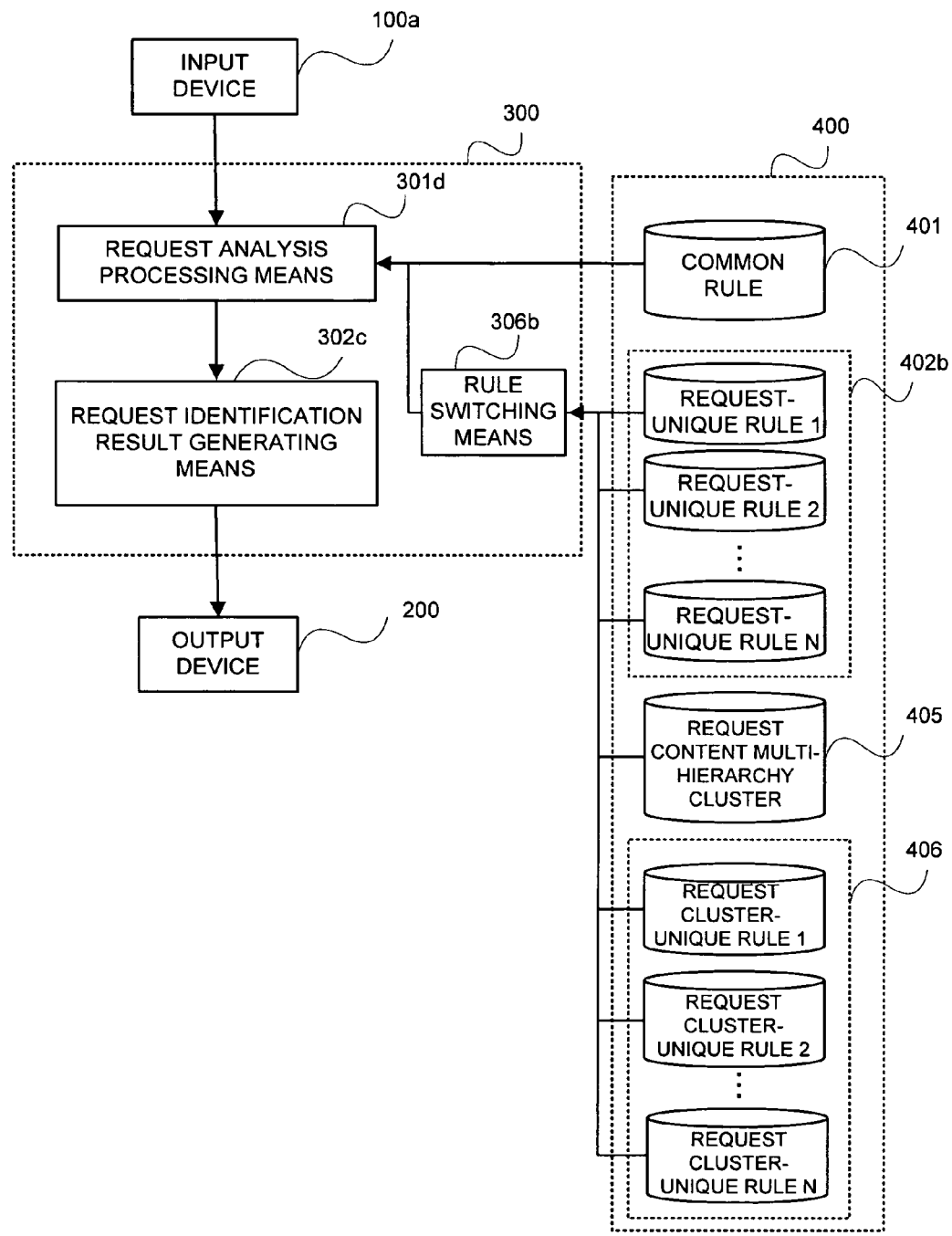
FIG. 11 is a block diagram signifying a configuration of the request content identification system relating to a sixth embodiment of the present invention.

A sixth embodiment of the present invention will be explained in detail by making a reference to the accompanied drawings. FIG. 11 is a block diagram signifying a configuration of the request content identification system relating to the sixth embodiment of the present invention. Upon making a reference to FIG. 11, the request content identification system relating to this embodiment is configured of an input device 100a, an output device 200, a computer (central processing unit; processor; data processing device) 300 that operates under control of a program, and a record medium 400.

A difference point with the above-mentioned fifth embodiment is a point that a request content multi-hierarchy cluster storing means 405 and a request cluster-unique rule storing means 406, each of which is later described, have been added to the record medium 400.

The computer (central processing unit; processor; data processing device) 300 includes and is configured of a request analysis processing means 301d, a rule switching means 306b and a request identification result generating means 302c, each of which is configured of a computer program.

The request analysis processing means 301d is a means for performing a request analysis process for the text data of the inputted information request sentence by employing the common rule stored in the common rule storing means 401, and an aggregation of request-unique rules that corresponds to the request content cluster being sequentially switched by the rule switching means 306b, out of all request-unique rules, i.e. a request-unique rule 1, a request-unique rule 2, ..., and a request-unique rule N stored request content by request content in the request-unique rule storing means 402b, and a request cluster-unique rule 1, a request cluster-unique rule 2, ..., and a request cluster-unique rule N stored request content cluster by request content cluster in the request cluster-unique rule storing means 406, and generates a syntax structure for the input request sentence by sequentially employing one rule, out of the common rule and an aggregation of the request-unique rules of all request-unique rules, which correspond to any request content cluster, out of all request-unique rules, thereby to output a list of the request content cluster and its request analysis score for the input request sentence as plural request analysis result candidates for the input request sentence.

The request identification result generating means 302c is a means for sorting out the candidates of the request content cluster for the input request sentence of the list outputted by the request analysis processing means 301d in the descending order of the score, and generating and outputting the request content cluster (expressed as an aggregation of the request content number) having a highest score as an identification result.

The rule switching means 306b, according to the content stored in the request content multi-hierarchy cluster storing means 405, sequentially makes a switchover to an aggregation of the request-unique rules that corresponds to any request content cluster, out of all of N request-unique rules, i.e. the request-unique rule 1, the request-unique rule 2, ..., and the request-unique rule N stored request content by request content in the request unique rule storing means 402b, and the request cluster-unique rule 1, the request cluster-unique rule 2, ..., and the request cluster-unique rule N stored request content cluster by request content cluster in the request cluster-unique rule storing means 406, thereby to provide an aggregation of the request-unique rules, which is employed for the request analysis process, to the request analysis processing means 301d.

The record medium 400 includes the common rule storing means 401, the request-unique rule storing means 402b, the request content multi-hierarchy cluster storing means 405, and the request cluster-unique rule storing means 406. The common rule storing means 401 stores the rules (common rule) for the syntax analysis described so as not to depend upon the unique request content, which are employed at the moment of performing a request analysis for the input request sentence in the request analysis processing means 301d. The request-unique rule storing means 402b takes the rules (request-unique rules) for the syntax analysis described by exclusively using a vocabulary and an expression unique to the unique request content, which are employed at the moment of performing a request analysis for the input request sentence in the request analysis processing means 301d, to be a corresponding request-unique rule request content by request content, and distinctively stores all of N request-unique rules, i.e. the request-unique rule 1, the request-unique rule 2, ..., and the request-unique rule N. The request content multi-hierarchy cluster storing means 405 stores a request content cluster (request content category) obtained by describing an aggregation of the inquiry contents each having a similar request content with a multi-hierarchal cluster structure (expressed with an aggregation of the request content numbers). Further, the request cluster-unique rule storing means 406 stores rules (request cluster-unique rules) for the syntax analysis described by exclusively using a vocabulary and an expression unique to the request content cluster as a corresponding request-unique rule cluster by cluster, namely, stores all of N request cluster-unique rules distinctly, i.e. the request cluster-unique rule 1, the request cluster-unique rule 2, ..., and the request cluster-unique rule N.

Figures 12, 13:
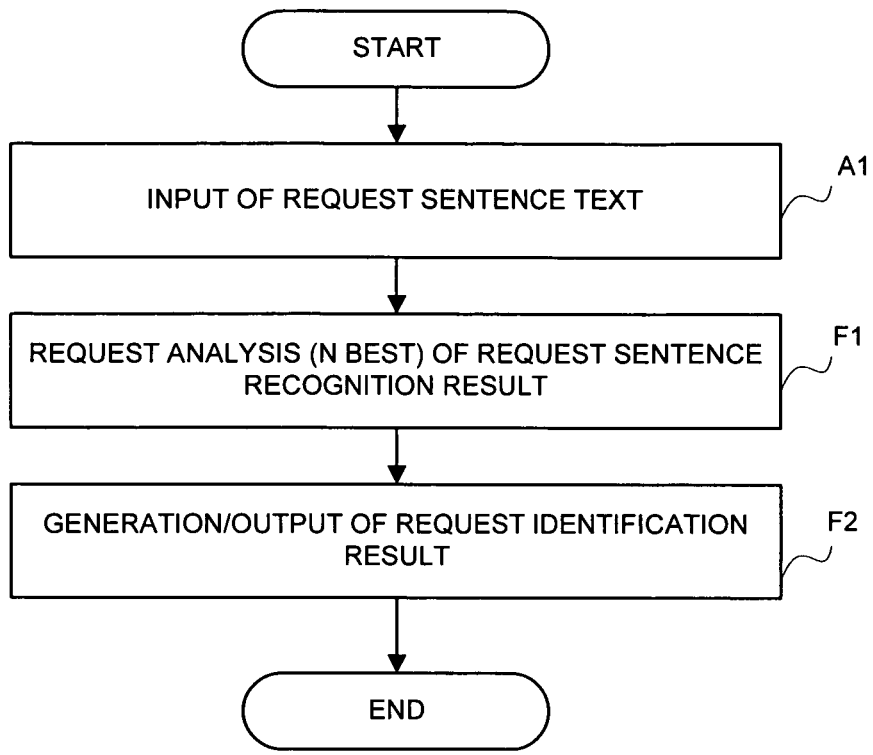
FIG. 12 is a flowchart signifying an operation of the request content identification system relating to the sixth embodiment of the present invention.
FIG. 13 shows one example of information request sentence texts (information request sentence audio data) for explaining an example of the present invention.

An operation of this embodiment will be explained in detail by making a reference to the accompanied drawings. FIG. 12 is a flowchart signifying an operation of the request content identification system relating to the sixth embodiment of the present invention. Upon making a reference to FIG. 12, at first, when the text data of the information request sentence is inputted by the input device 100a (step A1), the request analysis processing means 301d performs a request analysis process for the text data of the inputted information request sentence by employing the common rule stored in the common rule storing means 401, and an aggregation of the request-unique rules corresponding to the request content cluster that the rule switching means 306b sequentially switches, out of all request-unique rules stored in the request-unique rule storing means 402b and the request cluster-unique rule storing means 406, and generates a syntax structure, thereby to output a list (N best) of the request content cluster and the analysis score indicative of a degree of adaptability in the syntax analysis to the request content of each cluster for the input request sentence as plural request analysis result candidates for the input request sentence (step F1).

The request identification result generating means 302c sorts out all candidates of the input request sentence obtained by the request analysis processing means 301d in the descending order of the score, generates a request content cluster (expressed with an aggregation of the request content numbers) having a highest score as an identification result, and sends it to the output device 200 (step F2).

As mentioned above, this embodiment makes it possible to identify the inputted information request sentence as a request that corresponds to the appropriate request content cluster of which the content is nearest to that of the information request sentence also when the inputted information request sentence is an unknown request sentence and no request content number that directly corresponds hereto exists because the selection of the request content cluster based upon the above-mentioned analysis score is enabled in addition to an effect of the fifth embodiment.

An example of the present invention will be explained in order to specifically explain an operational effect of each of the above-mentioned embodiments.

EXAMPLE 1

Hereinafter, as a first example, an operation of the above-mentioned first embodiment of the present invention will be specifically explained by making a reference to FIG. 1 and FIG. 2, and FIG. 13 to FIG. 15 each of which is a supplementary drawing.

In this example, an explanation is made on the assumption that, in the step A1 of FIG. 2, an information request sentence "Sho-tome-ru jyusinn ji no gamenn ha settei dekimasu ka?" (a denotation symbol $r_A$ of FIG. 13) has been inputted into the input device 100a. FIG. 14 is a view signifying a specific example of common rules (a) and (b), and request content-unique rules (a) and (b) (each rule indicates one part of the entirety). Additionally, each of the request content-unique rules (a) and (b) of FIG. 14 is one part of the request-unique rule unique to a request content number 19.

As previously explained in the step A2 of FIG. 2, the request analysis processing means 301a performs a request analysis process for the request sentence of the foregoing denotation symbol $r_A$ of FIG. 13 by employing the common rule and the request-unique rule being obtained from the common rule storing means 401 and the request-unique rule storing means 402, respectively, and generates a syntax structure for the input request sentence, thereby to output a list of the request content number and its request analysis score for the input request sentence as plural request analysis result candidates for the input request sentence.

FIG. 15 is a view signifying the candidates and the analysis scores obtained with request analysis operation for the information request sentence of the denotation symbol $r_A$ of FIG. 13 that the request analysis processing means 301a has performed by employing the common rules (a) and (b) and the request content-unique rules (a) and (b) as shown in FIG. 14. Upon making a reference to FIG. 15, the analysis score of a first analysis candidate $S_1$ ($r_A$) having a request content $Q_{19}$ as a candidate is −25, that of a second analysis candidate $S_2$ ($r_A$) having a request content $Q_{15}$ as a candidate is −35, and that of a third analysis candidate $S_3$ ($r_A$) having a request content $Q_0$ as a candidate is −40.

And, as previously explained in the step A3 of FIG. 2, the request identification result generating means 302a sorts out all of these candidates in the descending order of the score, regards the candidate having a highest score as most excellent, generate its request content number as an identification result, and sends it to the output device 200. With the request analysis result exemplified in FIG. 15, the request content $Q_{19}$ (the analysis score=−25), the request content $Q_{15}$ (the analysis score=−35), and the request content $Q_0$ (the analysis score=−40) are obtained in the above-mentioned score order, and the request content $Q_{19}$ of the first analysis candidate $S_1$ ($r_A$) having a highest score is generated as an identification result.

EXAMPLE 2

Hereinafter, as a second example, an operation of the above-mentioned second embodiment of the present invention will be specifically explained by making a reference to FIG. 3 and FIG. 4, and FIG. 13 to FIG. 18 each of which is a supplementary drawing.

In this example, an explanation is made on the assumption that, in the step B1 of FIG. 4, the information request sentence "Sho-tome-ru jyusinn ji no gamenn ha settei dekimasu ka?" (the denotation symbol $r_A$ of FIG. 13) has been inputted with the audio into the input device 100b.

And, it is assumed that as a result of the audio recognition process in the audio recognition processing means 303 (step B2 of FIG. 4), the information request sentence of a denotation symbol $r_B$ of FIG. 13 (the audio recognition score=−20) as a first candidate of the information request sentence, and the information request sentence of a denotation symbol $r_A$ of FIG. 13 (the audio recognition score=−22) as a second candidate have been obtained.

And, as previously explained in the step B3 of FIG. 4, the request analysis processing means 301b performs a request analysis process for the request sentences of the foregoing denotation symbols $r_B$ and $r_A$ of FIG. 13, respectively, by employing the common rule and the request-unique rule being obtained from the common rule storing means 401 and the request-unique rule storing means 402, respectively, and generates a syntax structure for the input request sentence, thereby to output a list of the request content number and its request analysis score for the input request sentence as plural request analysis result candidates for the input request sentence.

FIG. 16 is a view signifying the candidate and the analysis score obtained with the request analysis process for the information request sentence of the denotation symbol $r_B$ of FIG. 13 that the request analysis processing means 301b has performed by employing the common rules (a) and (b) and the request content-unique rules (a) and (b) as shown in FIG. 14. Upon making a reference to FIG. 16, the analysis score of a first analysis candidate $S_1$ ($r_B$) having a request content $Q_{15}$, which is specified with the request content number 19, as a candidate is −35, that of a second analysis candidate $S_2$ ($r_B$) having a request content $Q_0$ as a candidate is −40, and that of a third analysis candidate $S_3$ ($r_B$) having a request content $Q_{19}$ as a candidate is −45.

The candidates and their analysis scores obtained by performing a request analysis operation for the information request sentence of the denotation symbol $r_A$ of FIG. 13 are ones explained by employing FIG. 15 in the previous example 1, and the analysis score of the first analysis candidate $S_1$ ($r_A$) having the request content $Q_{19}$, which is specified with the request number 19, as a candidate is −25, that of the second analysis candidate $S_2$ ($r_A$) having the request content $Q_{15}$ as a candidate is −35, and that of the third analysis candidate $S_3$ ($r_A$) having the request content $Q_0$ as a candidate is −40.

Thus, −20 is outputted as an audio recognition score of the request sentence (the first candidate) of the above-mentioned denotation symbol $r_B$, and the request content $Q_{15}$ (the analysis score=−35), the request content $Q_0$ (the analysis score=−40), and the request content $Q_{19}$ (the analysis score=−45) are outputted as a request analysis result from the request candidate score computing means 304a. Likewise, −22 is outputted as an audio recognition score of the request sentence (the second candidate) of the above-mentioned denotation symbol $r_A$, and the request content $Q_{19}$ (the analysis score=−25), the request content $Q_{15}$ (the analysis score=−35), and the request content $Q_0$ (the analysis score=−40) are outputted as a request analysis result from the request candidate score computing means 304a.

And, as previously explained in the step B4 of FIG. 4, the request candidate score computing means 304a records the audio recognition score of each above-mentioned audio recognition result candidate, and the request content number, and its request analysis score in the request candidate score table storing means 403.

FIG. 17 shows one example of the table in which, with the request sentence (the first candidate) of the above-mentioned denotation symbol $r_B$ and the request sentence (the second candidate) of the above-mentioned denotation symbol $r_A$, each audio recognition score, the request content number, and its request analysis score have been recorded.

In addition hereto, the request candidate score computing means 304a combines the audio recognition score and the request analysis score recorded in the above-mentioned table, thereby to compute an integration score for each of all candidates of the request contents for the inputted information request sentence, and to output the request content numbers together with the integration scores.

For example, the following equation (1) can be employed for computing the above-mentioned integration score. Where R_Score is an audio recognition score, P_Score is an analysis score, each of $\alpha$ ($\alpha$>0) and $\beta$ ($\beta$>0) is a connection parameter, and $\Theta$ is a threshold for the analysis score of the request analysis.

[Numerical equation 1]

$$\text{Score}(r_l, Q_i) = \alpha \cdot \text{R\_Score}(r_i) + \beta \cdot \max_{\{m|Q(S_m(r_i))=Q_i\}} (\text{P\_Score}(S_m(r_l)), \Theta) \quad (1)$$

Computing the integration score by request content number for each audio recognition result candidate by employing, for example, the above-mentioned Equation 1 (where $\alpha=\beta=1$ and $\Theta=100$) yields a result shown in FIG. 18. Upon making a reference to FIG. 18, the result of . . . , $-55(Q=Q_{15})$, . . . , $-65(Q=Q_{19})$, and . . . , $-60(Q=Q_0)$ for the request sentence (the first candidate) of the above-mentioned denotation symbol $r_B$, and the result of . . . , $-57(Q=Q_{15})$, . . . , $-47(Q=Q_{19})$, and . . . , $-62(Q=Q_0)$ for the request sentence (the second candidate) of the above-mentioned denotation symbol $r_A$ are obtained.

And, as previously explained in the step B5 of FIG. 4, when the request identification result generating means 302b sorts out all candidates for the input request sentence obtained by the request candidate score computing means 304a in the descending order of the integration score, it follows that, with the result of FIG. 18, Score($Q_{19}$)=$-47$, Score($Q_{15}$)=$-55$, and Score($Q_0$)=$-60$. And, $Q=Q_{19}$ having a highest score, being a most excellent candidate, is generated/outputted.

Herein, the point to which attention should be paid is that combining the above-mentioned request analysis results enables a correct result to be obtained similarly to the first example notwithstanding the fact that the input audio is the denotation symbol $r_A$ of FIG. 13, and as an audio recognition result thereof, the audio recognition score of the denotation symbol $r_B$ of FIG. 13 is higher than that of the denotation symbol $r_A$ of FIG. 13. In such a manner, the second embodiment (example) of the present invention make it possible to suppress an influence caused by an audio recognition error at a minimum level, and identify the request content precisely.

EXAMPLE 3

Hereinafter, as a third example, an operation of the above-mentioned third embodiment of the present invention will be specifically explained by making a reference to FIG. 5 and FIG. 6, and FIG. 13, FIG. 14, FIG. 16, FIG. 19, and FIG. 20 each of which is a supplementary drawing.

In this example, an explanation is made on the assumption that, in the step A1 of FIG. 6, an information request sentence "Sho-tome-ru jyusinn kinou gamenn ha settei dekimasu ka?" (the denotation symbol $r_B$ of FIG. 13) has been inputted into the input device 100a.

As previously explained in the step A2 of FIG. 6, the request analysis processing means 301a performs a request analysis process for the request sentence of the foregoing denotation symbol $r_B$ of FIG. 13 by employing the common rule and the request-unique rule being obtained from the common rule storing means 401 and the request-unique rule storing means 402, respectively, and generates a syntax structure for the input request sentence, thereby to output a list of the request content number and its request analysis score for the input request sentence as plural request analysis result candidates for the input request sentence.

The candidates and their analysis scores obtained by performing a request analysis process for the information request sentence of the denotation symbol $r_B$ of FIG. 13 are ones explained by employing FIG. 16 in the previous example 2, and the analysis score of the first analysis candidate $S_1$ ($r_B$) having the request content $Q_{15}$, which is specified with the request number 19, as a candidate is $-35$, that of the second analysis candidate $S_2$ ($r_B$) having the request content $Q_0$ as a candidate is $-40$, and that of the third analysis candidate $S_3$ ($r_B$) having the request content $Q_{19}$ as a candidate is $-45$.

As previously explained in the step C1 of FIG. 6, the similar document search processing means 305a performs a similar document search for the text data of the inputted information request sentence as a search request with the document data stored in the reply request data storing means 404 assumed to be an object, obtains a request content number and a similar document search score as a search result, and outputs a set of the request content number and its similar document search score.

FIG. 19 is a view signifying a relation between each of the information request sentences of the denotation symbols $r_A$ to $r_C$ and the similar document search score in the case of having made a similarity search to the content stored by the reply request data storing means 404.

Hereinafter, as shown in FIG. 19, an explanation is made on the assumption that, with the information request sentence of the denotation symbol $r_B$, for example, . . . , $+3(Q=Q_{15})$, and . . . , $+15(Q=Q_{19})$, . . . , are obtained as a similar document search score for request content numbers, respectively.

And, as previously explained in the step C2 of FIG. 6, the request candidate score computing means 304b combines the similar document search score and the request analysis score recorded in the above-mentioned table, thereby to compute an integration score for each of all candidates of the request contents for the inputted information request sentence, and to output the request content numbers together with the integration scores.

For example, the following equation (2) can be employed for computing the above-mentioned integration score. Where P_Score is an analysis score, IR_Score is a similar document search score, each of $\alpha$ ($\alpha$>0) and $\beta$ ($\beta$>0) is a connection parameter, and $\Theta$ is a threshold for the analysis score of the request analysis.

[Numerical equation 2]

$$\text{Score}(r_l, Q_i) = \alpha \cdot \max_{\{m|Q(S_m(r_i))=Q_i\}} (\text{P\_Score}(S_m(r_l)), \Theta) + \beta \cdot \text{IR\_Score}(r_l, Q_i) \quad (2)$$

Computing an integration score ($r_l$, $Q_i$) by the request content number by employing, for example, the above-mentioned Equation 2 (where $\alpha=\beta=1$, and $\Theta=100$) yields a result shown in FIG. 20. Upon making a reference to FIG. 20, the result of . . . , $-32(Q=Q_{15})$, . . . , $-30(Q=Q_{19})$, and . . . , $-40(Q=Q_0)$ is obtained for the request sentence (the first candidate) of the above-mentioned denotation symbol $r_B$.

And, as previously explained in the step B5 of FIG. 6, the request identification result generating means 302b sorts out all of these candidates in the descending order of the score, regards the candidate having a highest score as most excellent, generates its request content number as an identification result, and sends it to the output device 200. With the request analysis result exemplified in FIG. 20, the request content $Q_{19}$ (analysis score=−30), the request content $Q_{15}$, (analysis score=−32), and the request content $Q_0$ (analysis score=−40) are obtained in the above-mentioned order, and the request content $Q_{19}$ having a highest score is generated as an identification result.

The point to which attention should be paid is that, also in this example, for the input text of the denotation symbol $r_B$ of FIG. 13, combining the similar document search result and request analysis result thereof enables a correct result to be obtained similarly to the first example. In such a manner, the third embodiment (example) of the present invention as well make it possible to suppress an influence caused by an unknown request sentence and an audio recognition error at a minimum level, and to identify the request content precisely.

EXAMPLE 4

Hereinafter, as a fourth example, an operation of the above-mentioned fourth embodiment of the present invention will be specifically explained by making a reference to FIG. 7 and FIG. 8, and FIG. 13, FIG. 14, FIG. 16, FIG. 19, and FIG. 21 to FIG. 23 each of which is a supplementary drawing.

In this example, an explanation is made on the assumption that, in the step B1 of FIG. 8, the information request sentence "Sho-tome-ru jyusinn ji no gamenn ha settei dekimasu ka?" (the denotation symbol $r_A$ of FIG. 13) has been inputted with the audio into the input device 100b.

And, it is assumed that as a result of the audio recognition process in the audio recognition processing means 303 (step B2 of FIG. 8), the information request sentence of the denotation symbol $r_C$ of FIG. 13 (audio recognition score=−20) as a first candidate of the information request sentence, and the information request sentence of the denotation symbol $r_B$ of FIG. 13 (audio recognition score=−22) as a second candidate have been obtained.

And, as previously explained in the step B3 of FIG. 8, the request analysis processing means 301b performs a request analysis process for the request sentences of the foregoing denotation symbols $r_C$ and $r_B$ of FIG. 13, respectively, by employing the common rule and the request-unique rule being obtained from the common rule storing means 401 and the request-unique rule storing means 402, respectively, and generates a syntax structure for the input request sentence, thereby to output a list of the request content number and its request analysis score for the input request sentence as plural request analysis result candidates for the input request sentence.

FIG. 21 is a view signifying the candidate and its analysis score obtained with the request analysis process for the information request sentence of the denotation symbol $r_C$ of FIG. 13 that the request analysis processing means 301b has performed by employing the common rules (a) and (b) and the request content-unique rules (a) and (b) as shown in FIG. 14. Upon making a reference to FIG. 21, the analysis score of a first analysis candidate $S_1$ ($r_C$) having a request content $Q_0$ as a candidate is −50.

The candidates and their analysis scores obtained by performing a request analysis process for the information request sentence of the denotation symbol $r_B$ of FIG. 13 are ones explained by employing FIG. 16 in the previous example 2, and the analysis score of the first analysis candidate $S_1$ ($r_B$) having the request content $Q_{15}$, which is specified with the request content number 19, as a candidate is −35, that of the second analysis candidate $S_2$ ($r_B$) having the request content $Q_0$ as a candidate is −40, and that of the third analysis candidate $S_3$ ($r_B$) having the request content $Q_{19}$ as a candidate is −45.

As previously explained in the step D1 of FIG. 8, the similar document search processing means 305b performs a similar document search for the first audio recognition result candidate and the second audio recognition result candidate obtained in the audio recognition processing means 303 as a search request with the document data stored in the reply request data storing means 404 assumed to be an object, obtains the request content number and the similar document search score as a search result, and outputs a set of the request content number and its similar document search score.

As a result of the above-mentioned similar document search, as shown in FIG. 19, an explanation is made on the assumption that, with information request sentence of the denotation symbol $r_C$, for example, . . . , +2(Q=$Q_{15}$), and . . . , +2(Q=$Q_{19}$), . . . , are obtained as a similar document search score for the request content numbers, respectively, and with information request sentence of the denotation symbol $r_B$, for example, . . . , +3(Q=$Q_{15}$), and . . . , +15(Q=$Q_{19}$), . . . , are obtained as a similar document search score for the request content number, respectively.

And, as previously explained in the step D2 of FIG. 8, the request candidate score computing means 304c records the audio recognition score of each above-mentioned audio recognition result candidate, and the request content number, and its request analysis score in the request candidate score table storing means 403.

FIG. 22 shows one example of the table in which, with the request sentence (the first candidate) of the above-mentioned denotation symbol $r_C$ and the request sentence (the second candidate) of the above-mentioned denotation symbol $r_B$, each audio recognition score, and the request content number, and its request analysis score have been recorded.

In addition hereto, the request candidate score computing means 304c combines the audio recognition score and the request analysis score recorded in the above-mentioned table, and the similar document search score, thereby to compute an integration score for each of all candidates of the request contents for the inputted information request sentence, and to output the request content numbers together with the integration scores.

For example, the following equation (3) can be employed for computing the above-mentioned integration score. Where R_Score is an audio recognition score, P_Score is an analysis score, IR_Score is a similar document search score, each of α (α>0), β (β>0) and β (β>0) is a connection parameter, and Θ is a threshold for the analysis score of the request analysis.

[Numerical equation 3]

$$\text{Score}(r_l, Q_i) = \alpha \cdot \text{R\_Score}(r_l) + \beta \cdot \max_{\{m|Q(S_m(r_l))=Q_i\}} (\text{P\_Score}(S_m(r_l)), \Theta) + \gamma \cdot \text{IR\_Score}(r_l, Q_i) \quad (3)$$

Computing an integration score ($r_1$, $Q_i$) by the request content number, for example, the above-mentioned Equation (3) (where α=β=γ=1, and Θ=100) yields a result shown in FIG. 23. Upon making a reference to FIG. 23, the result of . . . , −118(Q=$Q_{15}$), . . . , −118(Q=$Q_{19}$), and . . . , −70(Q=$Q_0$) is obtained for the request sentence (the first candidate) of the denotation symbol $r_C$ of the audio recognition result, and the result of . . . , −54(Q=$Q_{15}$), . . . , −52(Q=$Q_{19}$), and . . . , −62(Q=$Q_0$) is obtained for the request sentence (the second candidate) of the denotation symbol $r_B$ of the audio recognition result.

And, as previously explained in the step B5 of FIG. 8, the request identification result generating means 302b sorts out all of these candidates in the descending order of the score, regards the candidate having a highest score as most excellent, generates its request content number as an identification result, and sends it to the output device 200. With the request analysis result exemplified in FIG. 23, the request content $Q_{19}$ (analysis score=−52), the request content $Q_{15}$, (analysis score=−54), and the request content $Q_0$ (analysis score=−62) are obtained in the above-mentioned score order, and the request content $Q_{19}$ having a highest score is generated as an identification result.

As mentioned above, also in this example, it is determined that the request content number $Q=Q_{19}$ is an most excellent identification result based upon the request analysis result and the similar document search for the second audio recognition result candidate $r_B$, in which the original uttered sentence has been relatively correctly recognized. In such a manner, the reason why the request content can be identified precisely lies in a point of, for the audio-inputted information request sentence, complementarily employing its audio recognition result, its similar document search result, and the request analysis result thereof, thereby to suppress an influence caused by an audio recognition error to a minimum level.

EXAMPLE 5

Hereinafter, as a fifth example, an operation of the above-mentioned fifth embodiment of the present invention will be specifically explained by making a reference to FIG. 9 and FIG. 10, and FIG. 13 and FIG. 24 to FIG. 25 each of which is a supplementary drawing.

In this example, an explanation is made on the assumption that, in the step A1 of FIG. 10, the information request sentence "Sho-tome-ru jyusinn ji no gamenn ha settei dekimasu ka?" (the denotation symbol $r_A$ of FIG. 13) has been inputted into the input device 100a. FIG. 24 is a view signifying a specific example of the common rules (a) and (b), the request content-unique rules distinctively stored in the request-unique rule storing means 402b (Each rule is indicative of one of the entirety). Additionally, each of the request content-unique rules 19(a) and 19(b) of FIG. 24 is one part of the request-unique rule 19 unique to the request content number 19, and a difference point with the request-unique rule shown in FIG. 14 is a point that the request content number has been omitted.

As previously explained in the step E1 of FIG. 10, the request analysis processing means 301c performs a request analysis process for the request sentence of the above-mentioned denotation symbol $r_A$ of FIG. 13 by employing the common rule, and the request-unique rule being sequentially switched by the rule switching means 306a, which are obtained from the common rule storing means 401 and the request-unique rule storing means 402b, respectively, and generates a syntax structure for the input request sentence by sequentially employing one rule, out of the common rule and all request-unique rules, thereby to output a list of the request content number and its request analysis score for the input request sentence as plural request analysis result candidates for the input request sentence.

FIG. 25 is a view signifying a first analysis candidate $S^{(19)}_1$ $(r_A)$ and its analysis score obtained with the request analysis process for the information request sentence of the denotation symbol $r_A$ of FIG. 13 that the request analysis processing means 301c has performed by employing the common rules (a) and (b) and the request-unique rules 19(a) and 19(b) as shown in FIG. 24, a first analysis candidate $S^{(15)}_1$ $(r_A)$ and its analysis score obtained by employing the common rule and a request content-unique rule 15, and a first analysis candidate $S^{(0)}_1$ $(r_A)$ obtained by employing only the common rule. Upon making a reference to FIG. 25, the analysis score of the first analysis candidate $S^{(19)}_1$ $(r_A)$ having the request content $Q_{19}$ as a candidate is −25, that of the first analysis candidate $S^{(15)}_1$ $(r_A)$ having the request content $Q_{15}$ as a candidate is −35, and that of the first analysis candidate $S^{(0)}_1$ $(r_A)$ having the request content $Q_0$ as a candidate is −40.

And, as previously explained in the step A3 of FIG. 10, the request identification result generating means 302a sorts out all of these candidates in the descending order of the score, regards the candidate having a highest score as most excellent, generates its request content number as an identification result, and sends it to the output device 200. With the request analysis result exemplified in FIG. 25, the request content $Q_{19}$ (analysis score=−25), the request content $Q_{15}$, (analysis score=−35), and the request content $Q_0$ (analysis score=−40) are obtained in the above-mentioned score order, and the request content $Q_{19}$ of the first analysis candidate $S^{(19)}_1$ $(r_A)$ having a highest score is generated as an identification result.

EXAMPLE 6

Hereinafter, as a sixth example, an operation of the above-mentioned sixth embodiment of the present invention will be specifically explained by making a reference to FIG. 11 and FIG. 12, and FIG. 13, FIG. 24 and FIG. 26 to FIG. 30 each of which is a supplementary drawing.

In this example, the case that, in the step A1 of FIG. 12, the information request sentence "Sho-tome-ru jyusinn ji no gamenn ha settei dekimasu ka?" (the denotation symbol $r_A$ of FIG. 13) has been inputted into the input device 100a, and the case that an information request sentence "Sho-tome-ru jyusinn ji no settei ha dekimasu ka?" (a denotation symbol $r_D$ of FIG. 26) has been inputted will be explained.

FIG. 27 is a view signifying a specific example of the request content multi-hierarchy cluster 405, which assumes a configuration for defining request content cluster numbers (C1 to C121 to CN) and request content numbers being included in each request content cluster. For example, the request content cluster 1 (C1) has request content number 1 and 5 affixed hereto as a definition, which resemble each other, and the request content cluster 3 (C3) has request content number 19 and 20 affixed hereto as a definition, which resemble each other.

FIG. 28 is a view illustrating a specific example of the request cluster-unique rule for each of the request content number 20 and the request content cluster 3 (C3). Additionally, each of the request content-unique rules 20(a) and 20(b) of FIG. 28 is one part of a request-unique rule 20 unique to the request content number 20, and the request cluster-unique rule 3 is one part of the request-unique rule unique to the request content cluster 3 (C3).

As previously explained in the step F1 of FIG. 12, the request analysis processing means 301d performs a request analysis process for the request sentence of the above-mentioned denotation symbol $r_A$ of FIG. 13 by employing the common rule, and an aggregation of the request-unique rules that the rule switching means 306b sequentially switches, out of the request-unique rules stored in the request-unique rule storing means 402b and the request cluster-unique rule storing means 406, generates a syntax structure for the input request sentence by sequentially employing one rule, out of the common rule and an aggregation of the request-unique rules corresponding to the request content cluster, thereby to output a list of the request content cluster (expressed with an aggregation of the request content numbers) and its request analysis score for the input request sentence as plural request analysis result candidates for the input request sentence.

FIG. 29 is a view signifying a first analysis candidate $S^{(19)}{}_1 (r_A)$ and its analysis score obtained with the request analysis process for the information request sentence of the denotation symbol $r_A$ of FIG. 13 that the request analysis processing means 301d has performed by employing the common rules (a) and (b) and the request content-unique rules 19(a) and 19(b) as shown in FIG. 24, a first analysis candidate $S^{(20)}{}_1 (r_A)$ obtained by employing the common rule and a request content-unique rules 20(a) and 20(b) as shown in FIG. 28, and a first analysis candidate $S^{(C3)}{}_1 (r_A)$ obtained by employing the request content-unique rule 19 that corresponds to a request content cluster 3 (C3: see FIG. 27), a request content-unique rule 20, and a request cluster-unique rule 3 (C3) as shown in FIG. 28.

Upon making a reference to FIG. 29, the analysis score of the first analysis candidate $S^{(19)}{}_1 (r_A)$ having the request content $Q_{19}$ as a candidate is −25, that of the first analysis candidate $S^{(20)}{}_1 (r_A)$ having the request content $Q_{20}$ as a candidate is −35, and that of the first analysis candidate $S^{(C3)}{}_1 (r_A)$ having the request content cluster 3 (C3) as a candidate is −25.

And, as previously explained in the step F2 of FIG. 12, the request identification result generating means 302c sorts out all of these candidates in the descending order of the score, regards the candidate having a highest score as most excellent, generates its request content cluster as an identification result, and sends it to the output device 200. With the request analysis result exemplified in FIG. 29, the request content $Q_{19}$ (analysis score=−25), the request content cluster 3 (analysis score=−25), and the request content $Q_{20}$ (analysis score=−35) are obtained in the above-mentioned score order (with the candidates each having an identical score, the candidate of which the number of the cluster components is smaller is juxtaposed in a higher rank), and the request content $Q_{19}$ of $S^{(19)}{}_1 (r_A)$ having a highest score is generated as an identification result.

Further, also in the case that, in the step A1 of FIG. 12, the information request sentence "Sho-tome-ru jyusinn ji no settei ha dekimasu ka?" (the denotation symbol $r_D$ of FIG. 26) has been inputted into the input device 100a, the situation is similar.

FIG. 30 is a view signifying a first analysis candidate $S^{(19)}{}_1 (r_D)$ and its analysis score obtained with the request analysis process for the information request sentence of the denotation symbol $r_D$ of FIG. 26 that the request analysis processing means 301d has performed by employing the common rules (a) and (b) and the request content-unique rules 19(a) and 19(b) as shown in FIG. 24, and a first analysis candidate $S^{(20)}{}_1 (r_D)$ obtained by employing the common rule and the request content-unique rules 20(a) and 20(b) as shown in FIG. 28, and a first analysis candidate $S^{(C3)}{}_1 (r_D)$ obtained by employing the request content-unique rule 19 that corresponds to the request content cluster 3 (C3), the request content-unique rule 20, and the request cluster-unique rule C3 as shown in FIG. 28.

Upon making a reference to FIG. 30, each of the first analysis candidate $S^{(19)}{}_1 (r_D)$ having the request content $Q_{19}$ as a candidate, and the first analysis candidate $S^{(20)}{}_1 (r_D)$ having the request content $Q_{20}$ as a candidate has an identical structure founded upon only the common rule, and each analysis score, which also identical, is −45. On the other hand, the analysis score of the first analysis candidate $S^{(C3)}{}_1 (r_D)$ having the request content cluster C3 as a candidate is −30.

And, as previously explained in the step F2 of FIG. 12, the request identification result generating means 302c sorts out all of these candidates in the descending order of the score, regards the candidate having a highest score as most excellent, generates its request content cluster as an identification result, and sends it to the output device 200. With the request analysis result exemplified in FIG. 30, the request content cluster 3 (analysis score=−30), the request content $Q_{19}$ (analysis score=−45), and the request content $Q_{20}$ (analysis score=−45) are obtained in the above-mentioned score order (with the candidates each having an identical score, the candidate of which the number of the cluster components is smaller is juxtaposed in a higher rank), and the request content cluster C3 of $S^{(C3)}{}_1 (r_D)$ having a highest score is generated as an identification result.

In such a manner, in this example, the input request sentence as well, which does not correspond to a specific request content number, can be identified as a request content cluster of its high-rank hierarchy and a result thereof can be outputted.

Above, while the modes for carrying out the present invention and the examples that conform to these have been particularly explained, respectively, the technical scope of the present invention is not limited to one described in the foregoing embodiments and examples, and it will be understood by those of ordinary skill in the art that various changes in form and details may be made responding to the application, the specification, etc. of the system that necessitates an identification of the request content.

The invention claimed is:

1. A request content identification system for analyzing a request sentence (input request sentence) inputted in a natural language format and identifying a request content, comprising:
   a generating unit configured to generate audio recognition result candidates by performing an audio recognition process for an audio-inputted input request sentence;
   a performing unit configured to perform a syntax analysis for each audio recognition result candidate of said input request sentence by employing a common rule for the syntax analysis that does not depend upon the request content, and request-unique rules for the syntax analysis unique to each request content;
   a score computing unit configured to calculate, for each of the audio recognition result candidates, an integration score obtained by combining an audio recognition score and a syntax analysis score for each request-unique rule employed in the syntax analysis; and
   an identifying unit configured to identify the request content corresponding to the request-unique rule employed in the syntax analysis having a highest integration score as a request content corresponding to said inputted request sentence.

2. A request content identification system for analyzing a request sentence (input request sentence) inputted in a natural language format and identifying a request content, comprising:
   a common rule storing unit configured to store a common rule for a syntax analysis that does not depend upon the request content;
   a request-unique rule storing unit configured to store request-unique rules for the syntax analysis unique to each request content;
   a generating unit configured to generate audio recognition result candidates by performing an audio recognition process for an audio-inputted input request sentence;
   a request analysis processing unit configured to perform the syntax analysis for each audio recognition result candidate of said input request sentence by employing the common rule for a syntax analysis that does not depend upon the request content, and the request-unique rule for the syntax analysis unique to each request content;

a score computing unit configured to calculate, for each of the audio recognition result candidates, an integration score obtained by combining an audio recognition score and a syntax analysis score for each request-unique rule employed in the syntax analysis; and a request identification result generating unit configured to identify the request content corresponding to the request-unique rule employed in the syntax analysis having a highest integration score as a request content corresponding to said inputted request sentence.

3. The request content identification system according to claim 2, wherein:

for said audio recognition result candidate of the input request sentence, said request analysis processing unit is configured to plurally generate analysis result candidates together with analysis scores indicative of a degree of adaptability to the request content previously prepared; and said request identification result generating unit is configured to select a most excellent analysis result candidate based upon said integration score, and generate an identification result of the request content.

4. The request content identification system according to claim 2, further comprising:

a similar document search processing unit configured to perform a similarity search process of searching for a data resembling the audio recognition result candidate of said audio-inputted input request sentence with at least one of a predetermined reply document data aggregation and a predetermined request sentence data aggregation assumed to be an object of search, and obtain a search result candidate together with a search score indicative of a degree of adaptability to the audio recognition result candidate of said input request sentence; and wherein said score computing unit is configured to calculate said integration score tinged with said search score; and said request identification result generating unit is configured to select a most excellent analysis result candidate based upon said integration score.

5. The request content identification system according to claim 2, wherein:

said request-unique rule storing unit is configured to store said request-unique rules classified for each content; and said request analysis processing unit is configured to perform a syntax analysis for the audio recognition result candidate of the input request sentence by sequentially switching said common rule and said classified request-unique rule.

6. The request content identification system according to claim 2, further comprising a request content cluster storing unit configured to store a request content cluster obtained by clustering the request contents resembling each other; and wherein said request identification result generating unit is configured to collect at least said integration scores for each said request content cluster, select a most excellent analysis result candidate cluster, and generate it as an identification result of the request content.

7. A request content identification method of identifying a request content using a natural language format inputted into a computer comprising a common rule storing unit configured to store a common rule for a syntax analysis that does not depend upon a request content, and a request-unique rule storing unit configured to store a request-unique rule for the syntax analysis unique to each request content, comprising:

a step in which said computer generates audio recognition result candidates by performing an audio recognition process for an audio-inputted input request sentence;

a step in which said computer performs the syntax analysis for each audio recognition result candidate of said input request sentence by employing said common rule and each said request-unique rule; and a step in which said computer calculates, for each of the audio recognition result candidates, an integration score obtained by combining an audio recognition score and a syntax analysis score for each request-unique rule employed in the syntax analysis; and a step in which said computer identifies the request content corresponding to the request-unique rule employed in the syntax analysis having a highest integration score as a request content corresponding to said input request sentence.

8. A non-transitory computer readable medium storing a computer program, which when executed, causes a computer to perform:

a process of storing a common rule for a syntax analysis that does not depend upon a request content, and storing a request-unique rule for the syntax analysis unique to each request content;

a process of generating audio recognition result candidates by performing an audio recognition process for an audio-inputted input request sentence;

a process of performing a syntax analysis for each audio recognition result candidate of said input request sentence using a natural language by employing said common rule and each said request-unique rule;

a process of calculating, for each of the audio recognition result candidates, an integration score obtained by combining an audio recognition score and a syntax analysis score for each request-unique rule employed in the syntax analysis; and a process of identifying the request content corresponding to the request-unique rule employed in the syntax analysis having a highest integration score as a request content corresponding to said input request sentence.

* * * * *

UNITED STATES PATENT AND TRADEMARK OFFICE
CERTIFICATE OF CORRECTION

PATENT NO.      : 8,583,435 B2                                          Page 1 of 1
APPLICATION NO. : 12/224885
DATED           : November 12, 2013
INVENTOR(S)     : Ishikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this
Twenty-second Day of September, 2015

Michelle K. Lee
*Director of the United States Patent and Trademark Office*